(12) United States Patent
Lallement et al.

(10) Patent No.: US 12,541,606 B2
(45) Date of Patent: Feb. 3, 2026

(54) DATA SYSTEM

(71) Applicant: Schlumberger Technology Corporation, Sugar Land, TX (US)

(72) Inventors: Christophe Lallement, Montpellier (FR); Alexandra-Violeta Iepure, Montpellier (FR); Sebastien Roche, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 205 days.

(21) Appl. No.: 18/550,167

(22) PCT Filed: Dec. 29, 2022

(86) PCT No.: PCT/US2022/082537
§ 371 (c)(1),
(2) Date: Sep. 12, 2023

(87) PCT Pub. No.: WO2023/130011
PCT Pub. Date: Jul. 6, 2023

(65) Prior Publication Data
US 2024/0152637 A1    May 9, 2024

Related U.S. Application Data

(60) Provisional application No. 63/295,656, filed on Dec. 31, 2021.

(51) Int. Cl.
*G06F 21/62* (2013.01)
*G01V 1/30* (2006.01)
(Continued)

(52) U.S. Cl.
CPC .............. *G06F 21/62* (2013.01); *G01V 1/306* (2013.01); *G01V 1/307* (2013.01); *G06F 21/31* (2013.01); *G06F 21/64* (2013.01); *H04L 9/50* (2022.05)

(58) Field of Classification Search
None
See application file for complete search history.

(56) References Cited

U.S. PATENT DOCUMENTS 10,320,757 B1    6/2019    Secker-Walker et al.
10,855,475 B1 *  12/2020   Leach .................. H04L 9/0637
(Continued)

FOREIGN PATENT DOCUMENTS

| WO | WO-2019231578 A1 * | 12/2019 | ........... H04L 9/3247 |
| WO | WO-2020206153 A1 * | 10/2020 | ......... G06F 16/2379 |
| WO | WO-2021046385 A1 * | 3/2021  | ........... E21B 47/005 |

OTHER PUBLICATIONS

Nakamoto, S., "Bitcoin: A Peer-to-Peer Electronic Cash System", Accessed via https://bitcoin.org/bitcoin.pdf; downloaded on Oct. 11, 2024, 9 pages.
(Continued)

Primary Examiner — Lashonda Jacobs-Burton
(74) Attorney, Agent, or Firm — Jeffrey D. Frantz

(57) ABSTRACT

A method can include instantiating a computational framework responsive to authentication of a credential of an entity; via the computational framework, accessing secure data registered on a blockchain ledger pursuant to a permission constraint of the entity; processing the data using the computational framework for generation of derivative data; and responsive to the generation of the derivative data, automatically transmitting an indicator for registration of the derivative data on the blockchain ledger.

20 Claims, 21 Drawing Sheets

(51) Int. Cl.
    *G06F 21/31*     (2013.01)
    *G06F 21/64*     (2013.01)
    *H04L 9/00*     (2022.01)

(56) References Cited

U.S. PATENT DOCUMENTS

| | | | |
|---|---|---|---|
| 10,915,641 B2* | 2/2021 | Smith | H04L 63/1433 |
| 12,360,274 B2* | 7/2025 | Rangarajan | G01V 1/40 |
| 2012/0324529 A1 | 12/2012 | Rangachari et al. | |
| 2019/0102423 A1 | 4/2019 | Little et al. | |
| 2019/0129994 A1* | 5/2019 | Astigarraga | H04L 41/5006 |
| 2020/0162260 A1* | 5/2020 | Boneti | H04L 67/10 |
| 2020/0382301 A1 | 12/2020 | Saket | |
| 2021/0224776 A1* | 7/2021 | Hundia | G06Q 20/223 |
| 2022/0058285 A1* | 2/2022 | Trenholm | G06F 16/9024 |
| 2023/0103486 A1* | 4/2023 | Nilsson | G06F 16/951 |
| | | | 726/26 |
| 2023/0118406 A1* | 4/2023 | Antonio | E21B 47/12 |
| | | | 705/27.1 |
| 2024/0003242 A1* | 1/2024 | Ambade | E21B 43/126 |
| 2024/0110469 A1* | 4/2024 | Mustapha | G06F 30/27 |

OTHER PUBLICATIONS

Neisse, R et al., "A Blockchain-based Approach for Data Accountability and Provenance Tracking, ARES 17", Proceedings of the 12th International Conference on Availability, Reliability and Security, Aug. 2017 Article No. 14, pp. 1-10.
Ethereum, "Ethereum Whitepaper", Accessed May 26, 2022 via ethereum.org/whitepaper/; 53 pages.
"Hyperledger Architecture, vol. I", downloaded on Dec. 30, 2024 from the internet [https://8112310.fs1.hubspotusercontent-na1.net/hubfs/8112310/Hyperledger/Offers/Hyperledger_Arch_WG_Paper_1_Consensus.pdf], 15 pages.
"What is Hyperledger Everything You Need to Know", downloaded on Dec. 30, 2024 from the internet [https://www.techtarget.com/searchcio/definition/Hyperledger], 3 pages.
"Hyperledger Architecture, vol. II", downloaded on Dec. 30, 2024 from the internet [https://8112310.fs1.hubspotusercontent-na1.net/hubfs/8112310/Hyperledger/Offers/Hyperledger_Arch_WG_Paper_2_SmartContracts.pdf], 14 pages.
"What is blockchain", IBM, downloaded on Dec. 30, 2024 from the internet [https://www.ibm.com/topics/blockchain], 25 pages.
"What is Etherum The foundation for our digital future", downloaded on Dec. 30, 2024 from the interntet [https://ethereum.org/en/what-is-ethereum/], 10 pages.
"Solidity", downloaded on Dec. 30, 2024 from the internet [https://docs.soliditylang.org/en/v0.5.3/], 1 page.
"Hyperledger", downloaded on Dec. 30, 2024 from the internet [https://github.com/hyperledger], 4 pages.
"Hyperledger Fabric", LF Decentralized Trust, downloaded on Dec. 30, 2024 from the internet [https://www.lfdecentralizedtrust.org/projects/fabric], 8 pages.
Hyperledger Composer, LF Decentralized Trust downloaded on Dec. 30, 2024 from the internet [https://lf-hyperledger.atlassian.net/wiki/spaces/composer/overview_hstc=120149271.08d0392bb4dd279f4500079807a7c16a.1730385289073.1730385289073.1733411458519.2__hssc=120149271.2.1733411458519__hsfp=2673780978], 2 pages.
"What is Hyperledger Fabric", IBM, downloaded on Dec. 30, 2024 from the internet, [https://www.ibm.com/topics/hyperledger], 17 pages.
PCT International Search Report and Written Opinion; Application No. PCT/US2022/082537; Dated Apr. 5, 2023; 12 pages.
Ren et al.; "Data sharing mechanism of various mineral resources based on blockchain"; Frontiers of Engineering Management 7; Dec. 7, 2020; pp. 592-604.
Yue et al.; "Big data model of secuirty sharing based on blockchain"; 2017 3rd International Conference on Big Data Computing and Communications (Bigcom) IEEE; pp. 117-121.

* cited by examiner

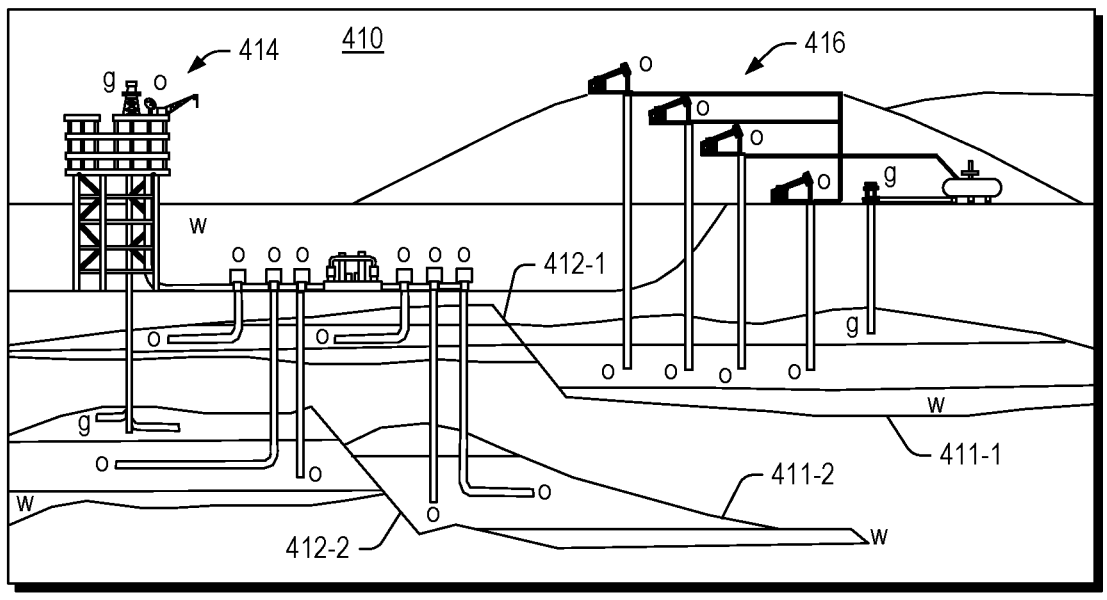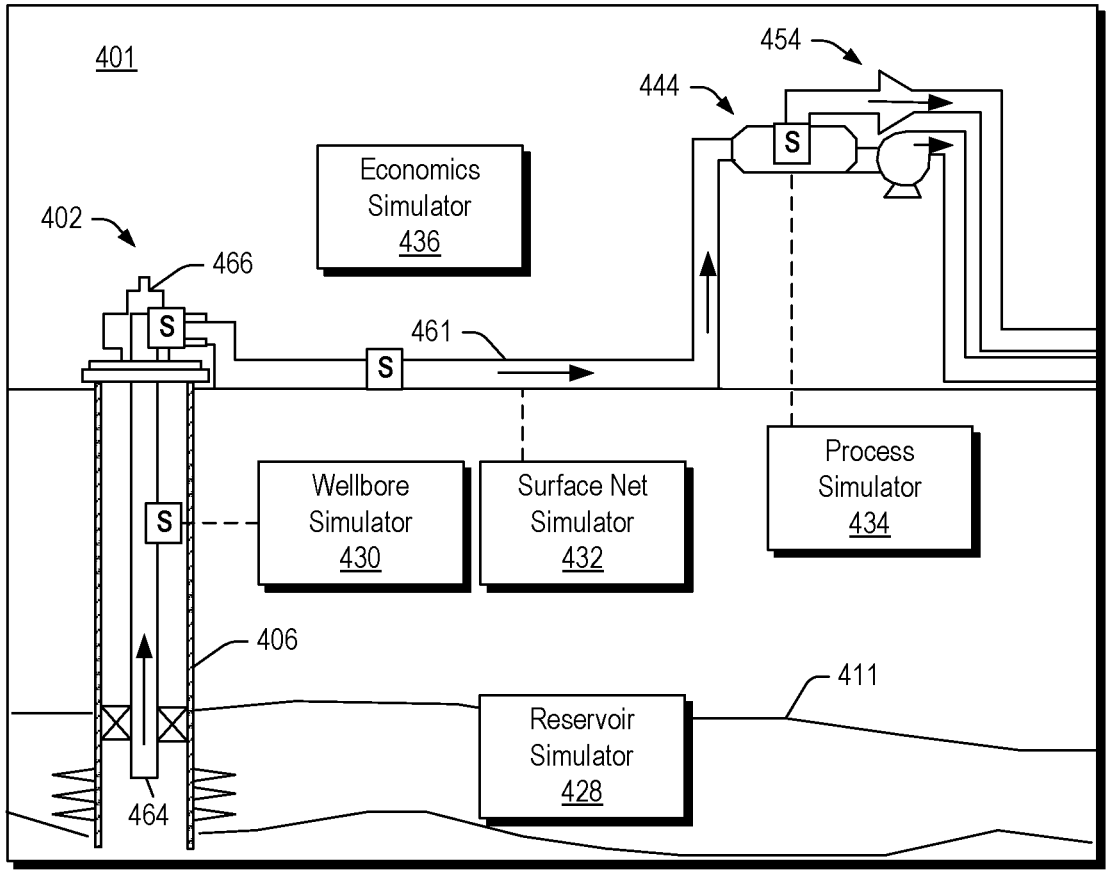
Fig. 4

900
 Data successfully uploaded.
Please fill in the information below to create the new data entry.
Client Name
| XYZ |
Data Owner
| ZZW |
Creation Date
| ZZ:YY:XX |
Classification
| Customer Development |
Purpose of Usage
| Data Editing |
Agreement Successfully Uploaded
Agreement
Cancel    Create Data Entry
Fig. 9

1110

| Data Album | | | | | | |
|---|---|---|---|---|---|---|
| Search | | | Creation Date ↑↓ | | Agreement | |
| | Development | Public | Secret | Development | Public | |
| Drag and drop here to create a new data entry | 90 days<br>Name:<br>Owner:<br>Creation: | 30 days<br>Name:<br>Owner:<br>Creation: | 9 days<br>Name:<br>Owner:<br>Creation: | 30 days<br>Name:<br>Owner:<br>Creation: | 30 days<br>Name:<br>Owner:<br>Creation: | |

1120

| Data Album | | |
|---|---|---|
| Search | Development | Public |
| Drag and drop here to create a new data entry | 90 days<br>Name:<br>Owner:<br>Creation: | Download  Edit<br>Open Data  History<br>30 days<br>Name:<br>Owner:<br>Creation: |

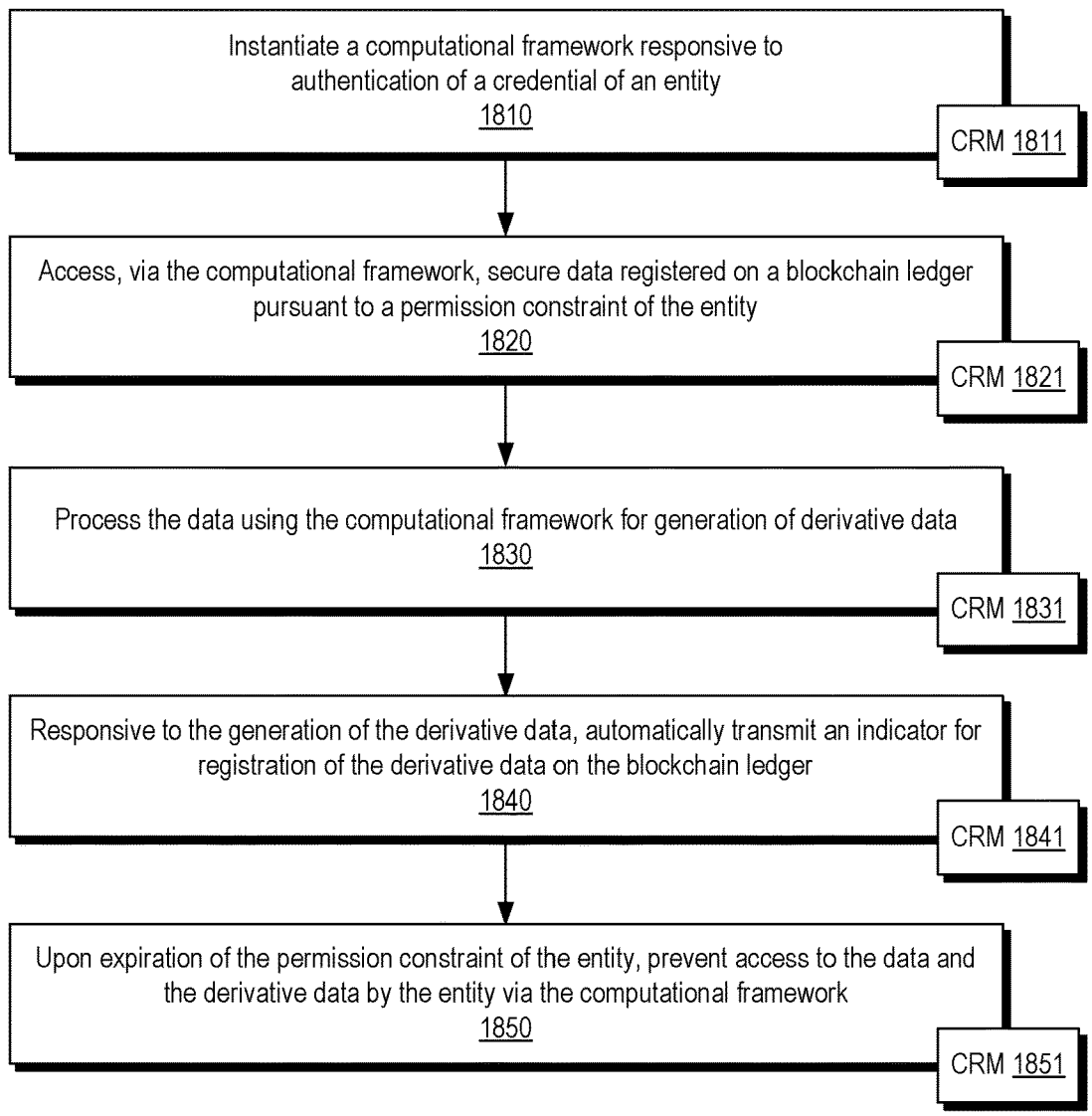
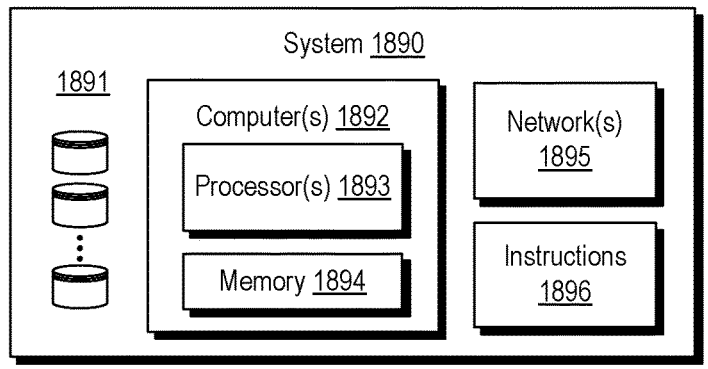
Fig. 18

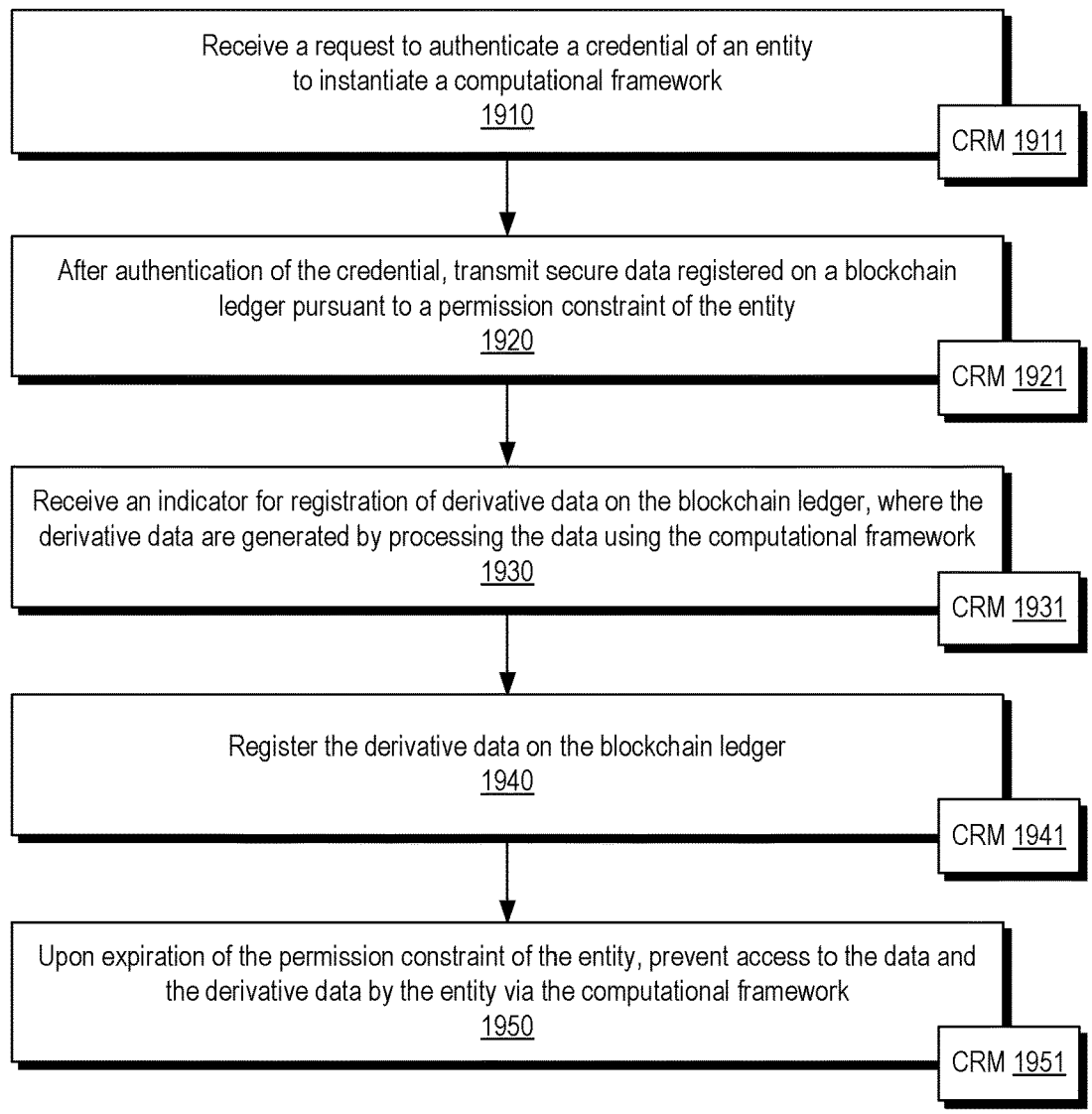
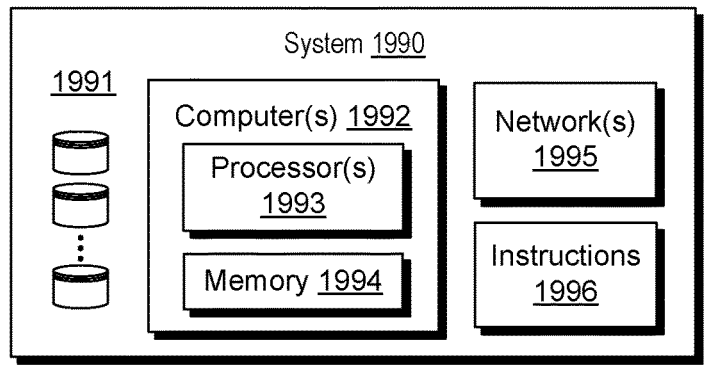
Fig. 19

DATA SYSTEM

RELATED APPLICATION

This application is a National Stage Entry of International Application No. PCT/US2022/082537, filed Dec. 29, 2022, which claims priority to and the benefit of a US Provisional Application having Ser. No. 63/295,656, filed 31 Dec. 2021, which is incorporated by reference herein in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations.

Various types of data can be generated before, during and/or after field operations. Such data may be public and/or private. For example, public data may include data reported to one or more governmental agencies, which may include some level of production data, emissions data, etc., as associated with field operations. Such data can be technical and may include sensor data, processed sensor data, etc., where a sensor may be local at a field, remote from a field (e.g., satellite, downwind, etc.), etc. Field operations may be performed by one or more entities where handling of data, classification of data, security of data, etc., can be concerns.

As an example of a type of data, consider wellbore data that are measured while and after drilling a well. In such an example, logs may be acquired using downhole equipment conveyed in a borehole, for example, in an open bore, non-cased portion of a well to determine open hole wellbore conditions. Such logs can be generated by and/or subjected to computations and interpretations. Data, such as, data from logs, may be utilized for one or more purposes. For example, consider data that may be utilized to train one or more machine learning models, tune one or more physics-based models, etc., where a trained and/or tuned model may be utilized during one or more field operations. For example, a trained and/or tuned model may be utilized for control of field equipment, which may provide for a higher level of automation (e.g., less human involvement). As automation can pose risks, data that are utilized for training and/or tuning may have to meet stringent standards, particularly where risks of data corruption and the like may exist as data are transferred from one source to another and/or processed using one or more machines where sources and/or machines may be distributed in one or more geographic regions of the world.

As data may be transferred from a field site in one country to a wellbore interpretation framework in another country and to a reservoir characterization framework in yet another country, possibly though one or more intermediary frameworks, which may be in yet another country or countries, tracking of data transfers and/or data residency can help to reduce risks and increase data value (e.g., assurances of quality, integrity, etc.). Tracking can also help to reduce risks where data are imported and exported from a project specific to a framework and/or a cloud application. While a framework or a cloud application may each have an associated, internal tracking mechanism (e.g., history tracking), a mechanism of sharing tracking information is lacking. For example, when importing data into a project of a framework, the history of such data may be stripped or otherwise incompatible for import in association with the data.

As explained, various entities can be involved in data generation and/or data handling where there can be an extreme reluctance to share data and/or associated information (e.g., metadata). Further, non-trusted actors exist, which can include spies and hackers, which may aim to hold data hostage and/or reuse data for an illegitimate purpose.

SUMMARY

A method can include instantiating a computational framework responsive to authentication of a credential of an entity; via the computational framework, accessing secure data registered on a blockchain ledger pursuant to a permission constraint of the entity; processing the data using the computational framework for generation of derivative data; and responsive to the generation of the derivative data, automatically transmitting an indicator for registration of the derivative data on the blockchain ledger. A system can include a processor; a memory accessible to the processor; processor-executable instructions stored in the memory and executable by the processor to instruct the system to: instantiate a computational framework responsive to authentication of a credential of an entity; via the computational framework, access secure data registered on a blockchain ledger pursuant to a permission constraint of the entity; process the data using the computational framework for generation of derivative data; and responsive to the generation of the derivative data, automatically transmit an indicator for registration of the derivative data on the blockchain ledger. One or more computer-readable storage media can include computer-executable instructions executable to instruct a computing system to: instantiate a computational framework responsive to authentication of a credential of an entity; via the computational framework, access secure data registered on a blockchain ledger pursuant to a permission constraint of the entity; process the data using the computational framework for generation of derivative data; and responsive to the generation of the derivative data, automatically transmit an indicator for registration of the derivative data on the blockchain ledger. A method can include receiving a request to authenticate a credential of an entity to instantiate a computational framework; after authentication of the credential, transmitting secure data registered on a blockchain ledger pursuant to a permission constraint of the entity; receiving an indicator for registration of derivative data on the blockchain ledger, where the derivative data are generated by processing the data using the computational framework; registering the derivative data on the blockchain ledger; and, upon expiration of the permission constraint of the entity, preventing access to the data and the derivative data by the entity via the computational framework. A system can include a processor; a memory accessible to the processor; processor-executable instructions stored in the memory and executable by the processor to instruct the system to: receive a request to authenticate a credential of an entity to instantiate a computational framework; after authentication of the credential, transmit secure data registered on a blockchain ledger pursuant to a permission constraint of the entity; receive an indicator for registration of derivative data on the blockchain ledger, where the derivative data are generated by processing the data using the computational framework; register the derivative data on the blockchain ledger; and, upon expiration of the permission constraint of the entity, prevent access to the data and the derivative data by the entity via the computational framework. One or more computer-readable storage media can include computer-executable instructions executable to instruct a computing system to: receive a request to authenticate a credential of an entity to instantiate a computational framework; after authentication of the credential, transmit secure data registered on a blockchain ledger pursuant to a permission constraint of the entity; receive an indicator for registration of derivative data on the blockchain ledger, where the derivative data are generated by processing the data using the computational framework; register the derivative data on the blockchain ledger; and, upon expiration of the permission constraint of the entity, prevent access to the data and the derivative data by the entity via the computational framework. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 4 illustrates examples of equipment and examples of simulators;

FIG. 9 illustrates an example of a graphical user interface;

FIG. 11 illustrates examples of graphical user interfaces;

FIG. 16 illustrates an example of a graphical user interface;

FIG. 18 illustrates an example of a method and an example of a system;

FIG. 19 illustrates an example of a method and an example of a system;

DETAILED DESCRIPTION

Figure 1:
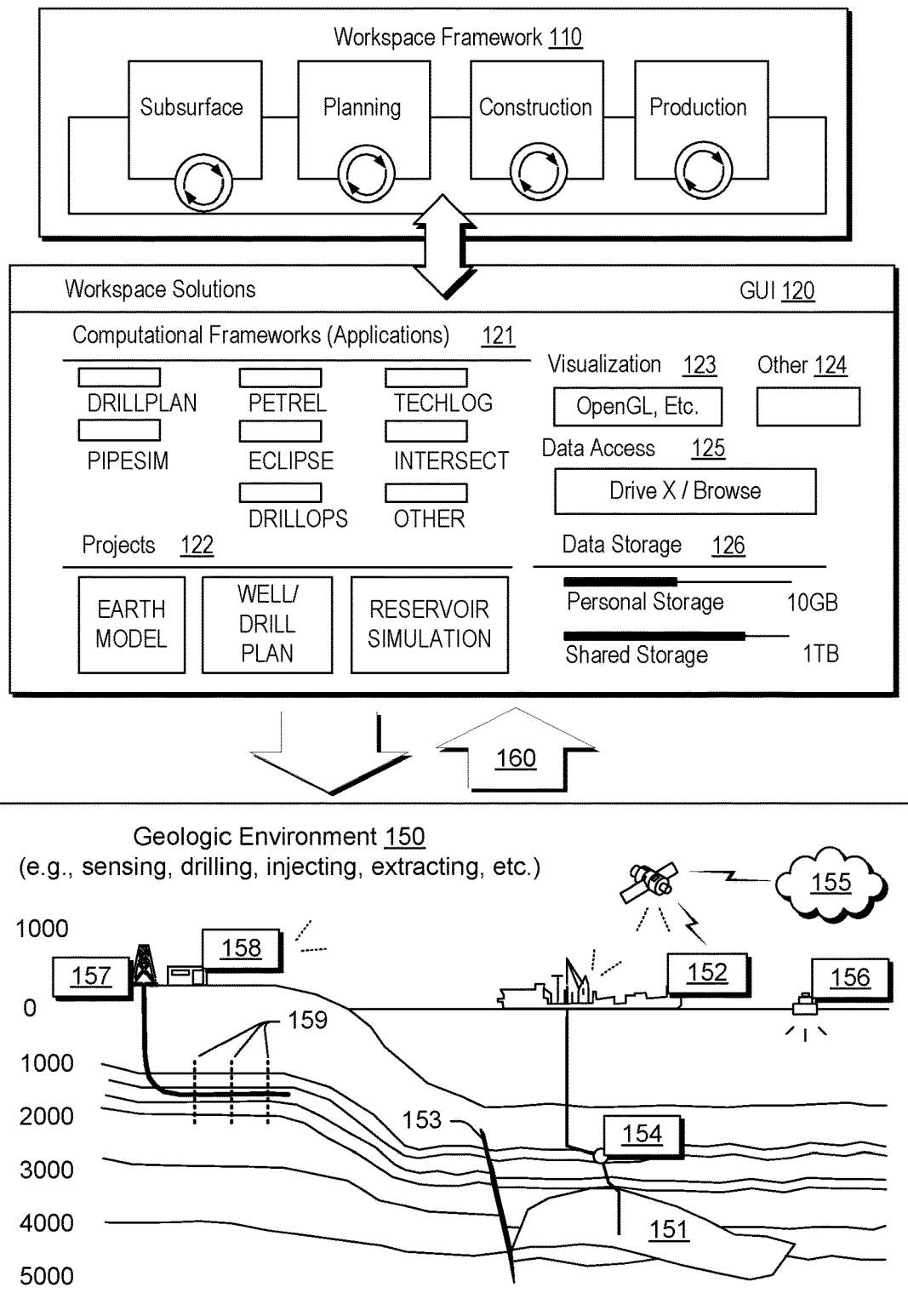
FIG. 1 illustrates an example system that includes various framework components associated with one or more geologic environments.

This description is not to be taken in a limiting sense, but rather is made merely for the purpose of describing the general principles of the implementations. The scope of the described implementations should be ascertained with reference to the issued claims.

As an example, a system can provide various features for tracking data such that at least some aspects of sensitive data can be aggregated while, for example, guaranteeing privacy and ownership of such data. Such a system can improve data usage, for example, consider an ability to aggregate data for purposes of training a machine learning model, noting that some types of models can demand a substantial amount of training data. In such an example, the system may provide for contractual terms, for example, in the form of one or more digital smart contracts that can manage how data are handled, uses thereof, and even products generated by such data. As described herein, operations on sensitive data can occur in a trusted environment, which can be granted by a blockchain infrastructure. As an example, a system can allow for wellbore interpretation and reservoir characterization frameworks to operate in an improved manner where assurances exist as to how entity owned data are going to be stored, processed, and transmitted. In such an example, the system can offer levels of transparency and traceability of transactions on field data, which can improve the value of field data at least in part by making such data available for multiple uses.

As explained, a system can utilize blockchain technology to improve data handling, data uses, etc., for various types of field data, which can include types of field data that can be valuable in that they can be costly to acquire and/or rare. For example, field data acquired during drilling can be considered as being associated with the cost of drilling. In such an example, a borehole may be drilled into a subsurface geologic region to a considerable depth with a length that can exceed a kilometer. Such a borehole may be relatively small in size and hence represent a very small sampling of the subsurface geologic region. In some instances, there may be neighboring wells with associated data; however, in other instances, there may be no neighboring wells such that decision making, control, etc., are based on a scant amount of data from a single borehole. As an example, a system can help to provide assurances in handling data such that data may be more readily used for one or more purposes. In such an example, the system may provide for digital contractual terms, for example, in the form of one or more smart contracts. As mentioned, a system may utilize one or more blockchain techniques and/or technologies to help assure terms are met, actions are controlled, histories are recorded, etc.

FIG. 1, FIG. 2, FIG. 3, FIG. 4, FIG. 5, and FIG. 6, which are described below, illustrate various examples of equipment, scenarios, etc., where data can be acquired, processed, used, etc. As an example, a system can provide for handling of such data in a manner that helps to assure trust and integrity, while also allowing for an expansion of uses.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows various features of a computational environment that can include various features of the DELFI environment, which may be referred to as the DELFI framework, which may be a framework of frameworks. As an example, the DELFI framework can include various other frameworks, which can include, for example, one or more types of models (e.g., simulation models, etc.). Some examples of frameworks can include the DRILLPLAN, PETREL, TECHLOG, PIPESIM, ECLIPSE, INTERSECT, and DRILLOPS frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The DRILLOPS framework can execute a digital drilling plan and ensures plan adherence, while delivering goal-based automation. The DRILLOPS framework can generate activity plans automatically individual operations, whether they are monitored and/or controlled on the rig or in town. Automation can utilize data analysis and learning systems to assist and optimize tasks, such as, for example, setting ROP to drilling a stand. A preset menu of automatable drilling tasks can be rendered, and, using data analysis and models, a plan can be executed in a manner to achieve a specified goal, where, for example, measurements can be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) can be continually monitored and dynamically updated using feedback from operational activities. The DRILLOPS framework can provide for various levels of automation based on planning and/or re-planning (e.g., via the DRILLPLAN framework), feedback, etc.

The PETREL framework is part of the DELFI cognitive E&P environment (SLB, Houston, Texas) for utilization in geosciences and geoengineering, for example, to analyze subsurface data from exploration, to development, to drilling, to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an approach, one or more features of a framework that may be available in one language may be accessed via a converter. For example, consider the APACHE SPARK framework that can include features available in a particular language where a converter may convert code in another language to that particular language such that one or more of the features can be utilized. As an example, a production field may include various types of equipment, be operable with various frameworks, etc., where one or more languages may be utilized. In such an example, a converter may provide for feature flexibility and/or compatibility.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As an example, the GUI 120 of FIG. 1 can provide for access to data that can be managed via a system that implements one or more blockchain ledgers. In such an example, various actions on data may be tracked and, for example, managed via one or more types of agreements, constraints, etc. In the example of FIG. 1, actions performed on data by one or more of the computational frameworks (e.g., applications) 121 may be registered on to one or more blockchain ledgers, which may provide for history generation, auditing, etc. As an example, derivative data as derived by processing accessed data via one or more of the computational frameworks 121 may be registered on one or more blockchain ledgers. As an example, where a constrain exists as to data, it may be carried over to derivative data such that violation of the constraint may prevent access to the data and the derivative data by one or more entities, one or more frameworks, etc. As an example, the GUI 120 of FIG. 1 may provide for browsing, navigating, searching, filtering, etc., various datasets. In such an example, a marketplace for data may exist where data may be accessed subject to one or more constraints, which may be registered on and/or linked to one or more blockchain ledgers. As an example, one or more application programming interfaces (APIs) can exist between an environment, a framework, etc., and a data system that utilizes one or more blockchain ledgers.

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where later acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck, between model scale and computational resources, that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (SLB, Houston Texas) or the PETROMOD simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (SLB, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (SLB, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

As an example, a framework may include various toolkit features. For example, consider PYTHON toolkit features. Such toolkit features can provide extensibility for one or more additional functionalities for a framework or frameworks.

Figure 2:
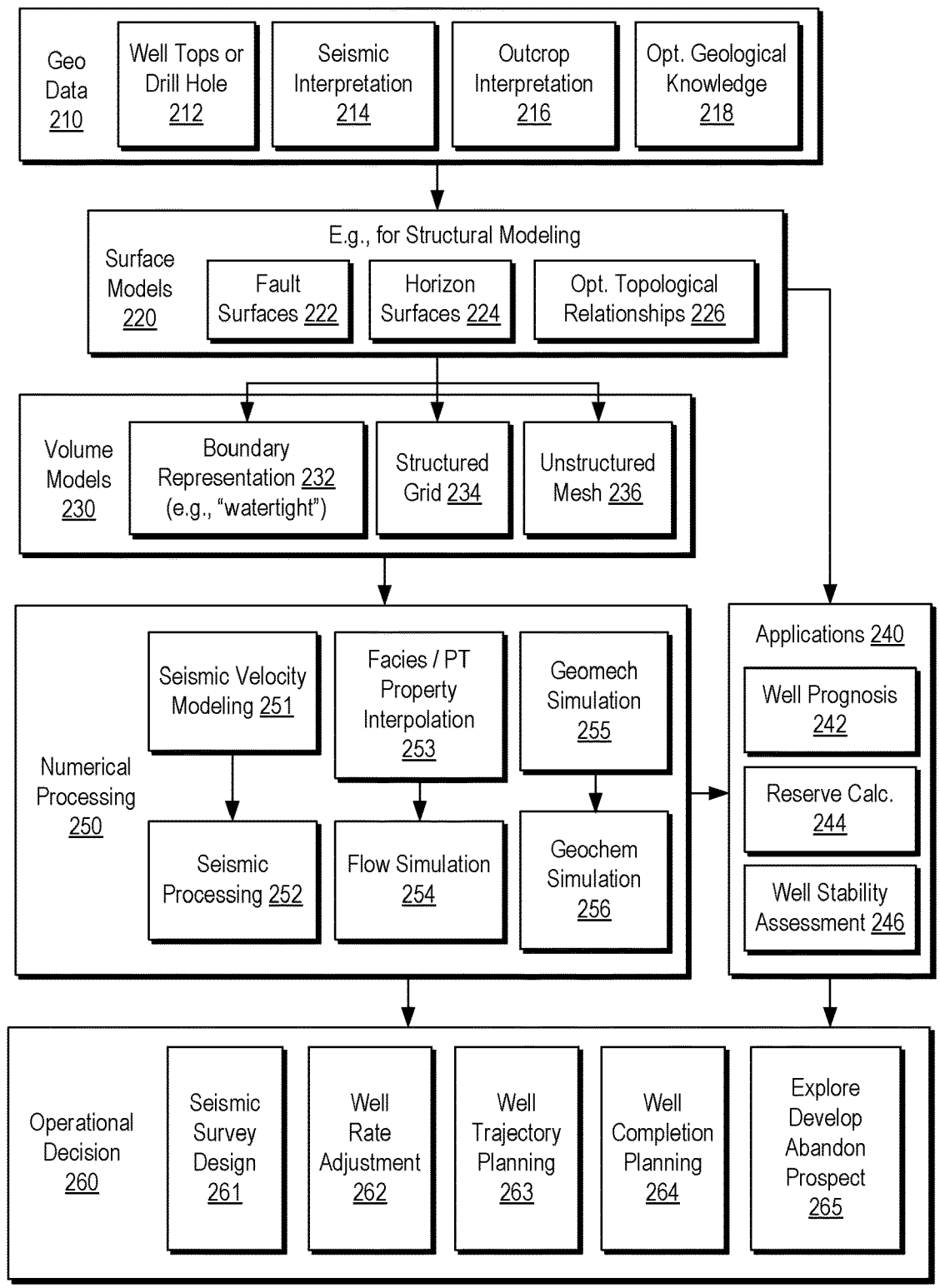
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g., fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example, a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, DRILLOPS, PETREL, TECHLOG, PIPESIM, ECLIPSE, INTERSECT, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data such as production data and/or production-related data. For example, consider the operational decision block 260 as including capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

Figure 3:
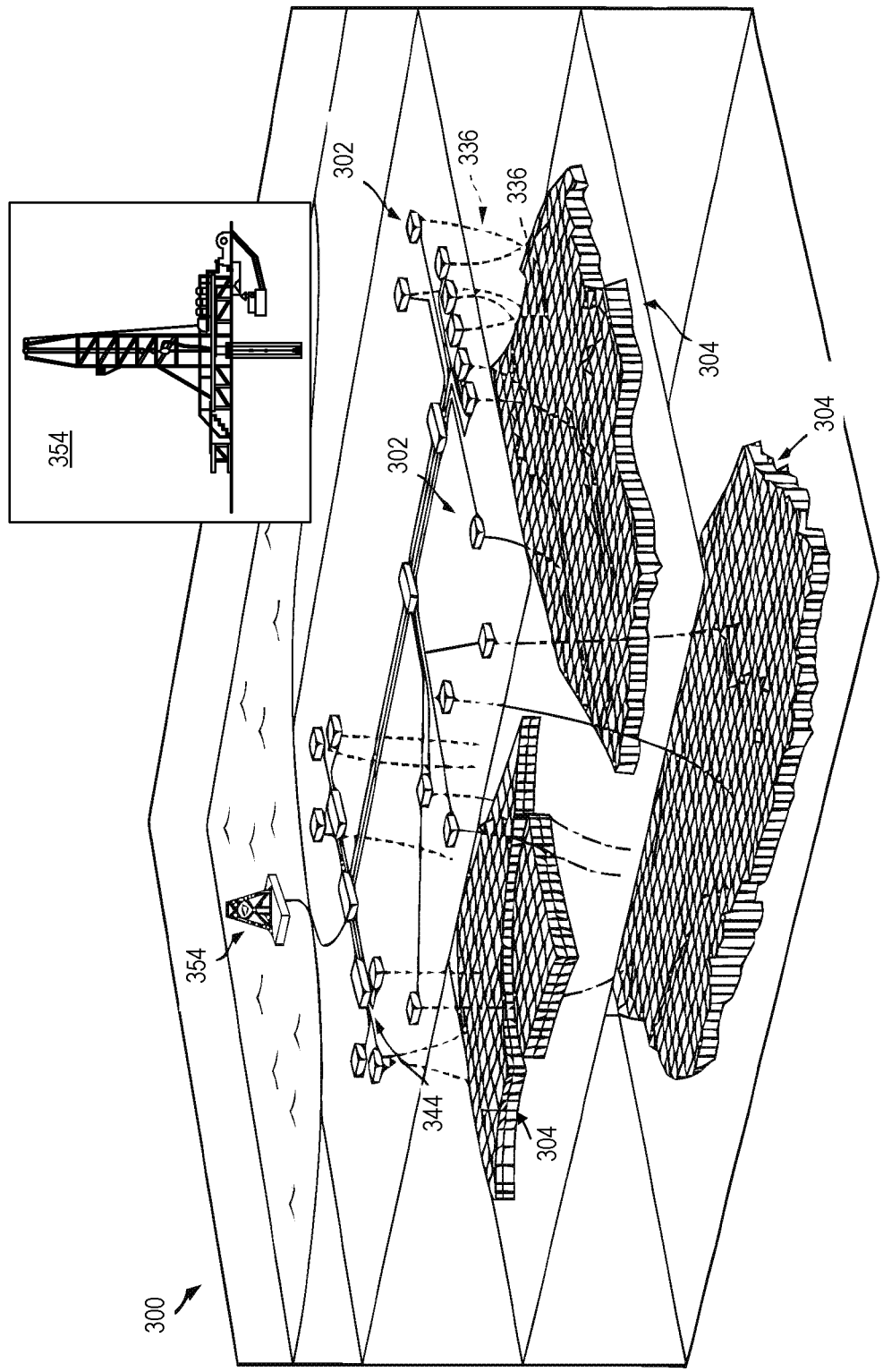
FIG. 3 illustrates an example of a geologic environment and examples of equipment.

FIG. 3 shows an example of a geologic environment 300 as including various types of equipment and features. As shown, the geologic environment 300 includes a plurality of wellsites 302, which may be operatively connected to a processing facility. In the example of FIG. 3, individual wellsites 302 can include equipment that can form individual wellbores 336. Such wellbores can extend through subterranean formations including one or more reservoirs 304. Such reservoirs 304 can include fluids, such as hydrocarbons. As an example, wellsites can provide for flow of fluid from one or more reservoirs and pass them to one or more processing facilities via one or more surface networks 344. As an example, a surface network can include tubing and control mechanisms for controlling flow of fluids from a wellsite to a processing facility. In the example of FIG. 3, a rig 354 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

As mentioned, the geologic environment 300 can include various types of equipment and features. As an example, consider one or more sensors that can be located within the geologic environment 300 for purposes of sensing physical phenomena (e.g., pressure, temperature, flow rates, composition, density, viscosity, solids, flare character, compaction, etc.). As an example, equipment may include production equipment such as a choke valve where individual wells may each include a choke valve that can regulate flow of fluid from a well. As an example, equipment may include artificial lift equipment that can facilitate production of fluid from a reservoir. Artificial lift can be implemented as part of a production strategy whereby energy can be added to fluid to help initiate and/or improve production. Artificial lift equipment may utilizes one or more of various operating principles, which can include, for example, rod pumping, gas lift, electric submersible pumps, etc. Referring again to FIG. 2, the operational decision block 260 may include planning for artificial lift, call for artificial lift, controlling one or more artificial lift operations, etc.

As an example, enhanced oil recovery (EOR) may be employed in the geologic environment 300, which may be based on one or more outputs of a system such as the system 200, the system 100, etc. EOR can aim to alter fluid properties, particularly properties of hydrocarbons. As an example, EOR may aim to restore formation pressure and/or improve oil displacement or fluid flow in a reservoir. EOR may include chemical flooding (e.g., alkaline flooding or micellar-polymer flooding), miscible displacement (e.g., carbon dioxide injection or hydrocarbon injection), thermal recovery (e.g., steam flood or in-situ combustion), etc. EOR may depend on factors such as reservoir temperature, pressure, depth, net pay, permeability, residual oil and water saturations, porosity and fluid properties such as oil API gravity and viscosity. Enhanced oil recovery may be referred to at times as improved oil recovery or tertiary recovery.

FIG. 4 shows an example of portion of a geologic environment 401 and an example of a larger portion of a geologic environment 410. As shown, a geologic environment can include one or more reservoirs 411-1 and 411-2, which may be faulted by faults 412-1 and 412-2 and which may include oil (o), gas (g) and/or water (w). FIG. 4 also shows some examples of offshore equipment 414 for oil and gas operations related to the reservoirs 411-1 and 411-2 and onshore equipment 416 for oil and gas operations related to the reservoir 411-1. As an example, a system may be implemented for operations associated with one or more of such reservoirs.

As to the geologic environment 401, FIG. 4 shows a schematic view where the geologic environment 401 can include various types of equipment. As shown in FIG. 4, the environment 401 can includes a wellsite 402 and a fluid network 444. In the example of FIG. 4, the wellsite 402 includes a wellbore 406 extending into earth as completed and prepared for production of fluid from a reservoir 411 (e.g., one of the reservoirs 411-1 or 411-2).

In the example of FIG. 4, wellbore production equipment 464 extends from a wellhead 466 of the wellsite 402 and to the reservoir 411 to draw fluid to the surface. As shown, the wellsite 402 is operatively connected to the fluid network 444 via a transport line 461. As indicated by various arrows, fluid can flow from the reservoir 411, through the wellbore 406 and onto the fluid network 444. Fluid can then flow from the fluid network 444, for example, to one or more fluid processing facilities.

In the example of FIG. 4, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit (e.g., to instruct the sensors to acquire data, to collect data from the sensors, etc.).

In the example of FIG. 4, a surface unit can include computer facilities, such as a memory device, a controller, one or more processors, and display unit (e.g., for managing data, visualizing results of an analysis, etc.). As an example, data may be collected in the memory device and processed by the processor(s) (e.g., for analysis, etc.). As an example, data may be collected from the sensors (S) and/or by one or more other sources. For example, data may be supplemented by historical data collected from other operations, user inputs, etc. As an example, analyzed data may be used to in a decision making process.

As an example, a transceiver may be provided to allow communications between a surface unit and one or more pieces of equipment in the environment 401. For example, a controller may be used to actuate mechanisms in the environment 401 via the transceiver, optionally based on one or more decisions of a decision making process. In such a manner, equipment in the environment 401 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit or other unit, system, etc.). As an example, data fed into one or more simulators may be historical data, real time data or combinations thereof. As an example, simulation through one or more simulators may be repeated or adjusted based on the data received.

In the example of FIG. 4, simulators can include a reservoir simulator 428, a wellbore simulator 430, a surface network simulator 432, a process simulator 434 and an economics simulator 436. As an example, the reservoir simulator 428 may be configured to solve for hydrocarbon flow rate through a reservoir and into one or more wellbores. As an example, the wellbore simulator 430 and surface network simulator 432 may be configured to solve for hydrocarbon flow rate through a wellbore and a surface gathering network of pipelines. As to the process simulator 434, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 436 may be configured to model costs associated with at least part of an operation. For example, consider MERAK framework (SLB, Houston, Texas), which may provide for economic analyses.

As an example, a system can include and/or be operatively coupled to one or more of the simulators 428, 430, 432, 434 and 436 of FIG. 4. As an example, such simulators may be associated with frameworks and/or may be considered tools (see, e.g., the system 100 of FIG. 1, etc.). Various pieces of equipment in the example geologic environments 401 and 410 of FIG. 4 may be operatively coupled to one or more systems, one or more frameworks, etc. As an example, one or more of the sensors (S) may be operatively coupled to one or more networks (e.g., wired and/or wireless) for transmission of data, which, as explained, may include data indicative of production. As shown, a sensor (S) may be utilized for acquisition of downhole data and/or surface data, which can include data relevant to production (e.g., flow rate, temperature, pressure, composition, etc.). Such data may be utilized in a system such as, for example, the system 200 of FIG. 2 for operational decision making, etc.

Figure 5:
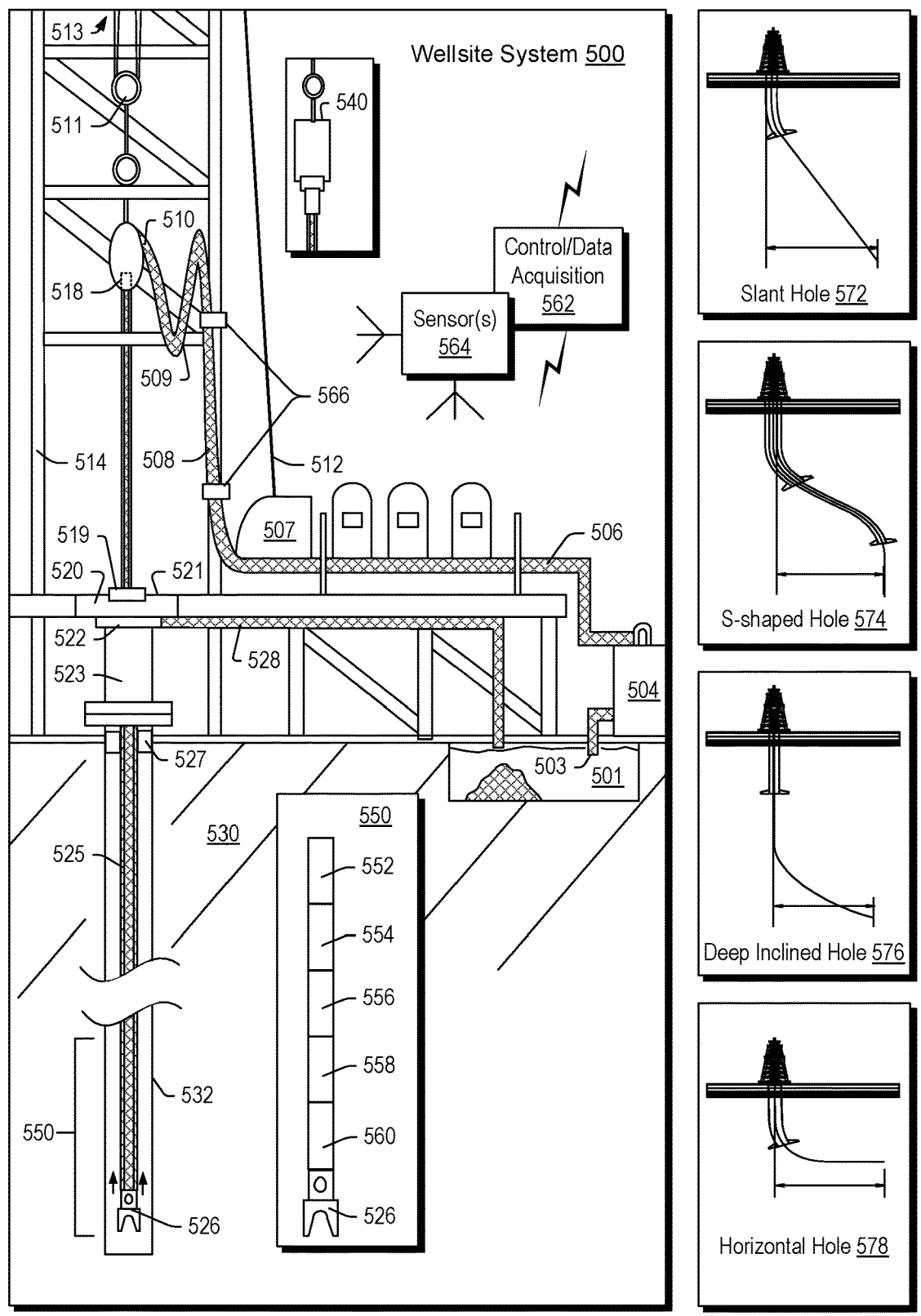
FIG. 5 illustrates an example of a system.
Figure 6:
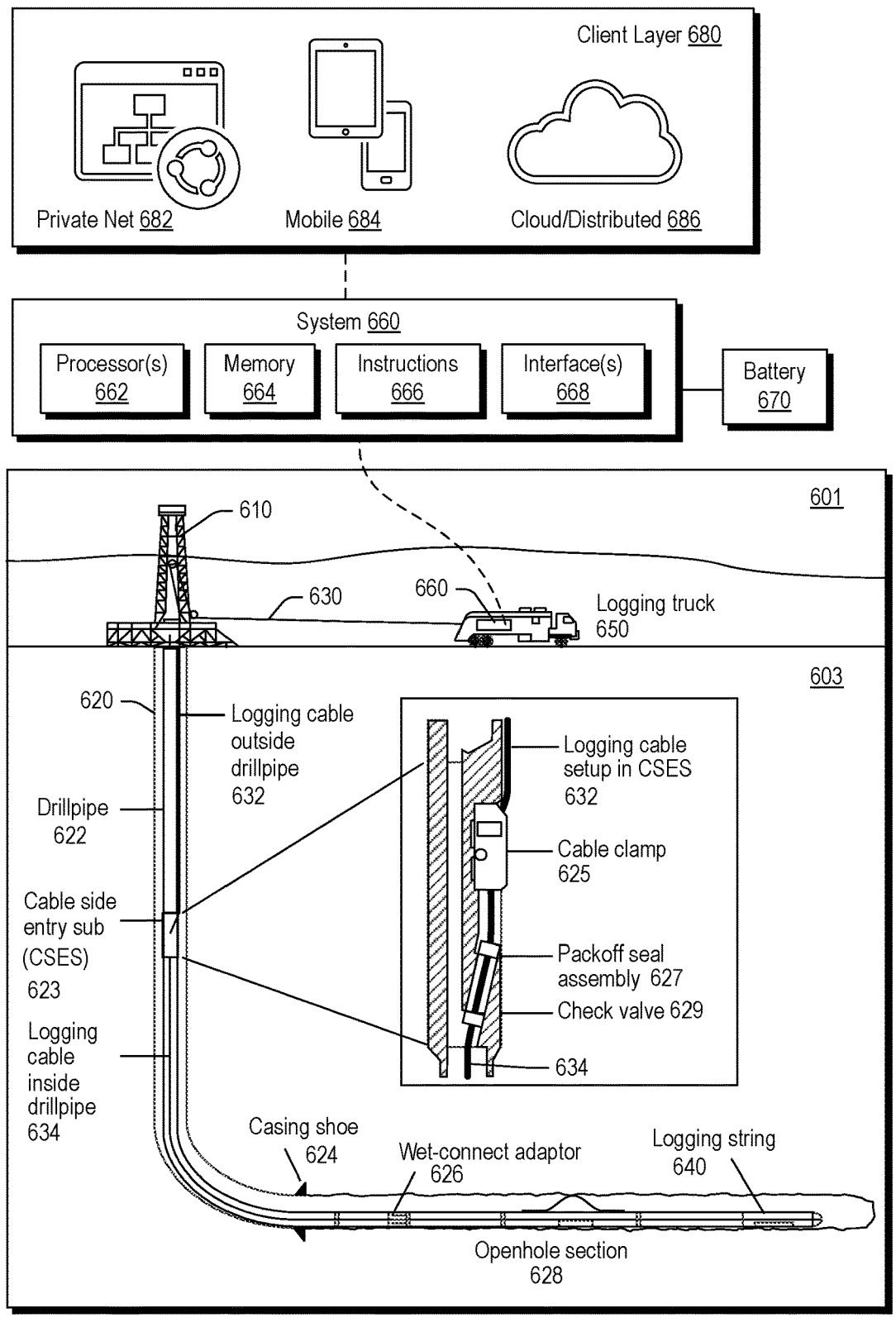
FIG. 6 illustrates an example of a system.

FIG. 5 and FIG. 6 illustrate various examples of equipment that may be utilized in one or more workflows that include, at least in part, acquiring well log data. As an example, a method may be implemented during use of such equipment, using data acquired by such equipment, etc.

FIG. 5 shows an example of a wellsite system 500 (e.g., at a wellsite that may be onshore or offshore). As shown, the wellsite system 500 can include a mud tank 501 for holding mud and other material (e.g., where mud can be a drilling fluid), a suction line 503 that serves as an inlet to a mud pump 504 for pumping mud from the mud tank 501 such that mud flows to a vibrating hose 506, a drawworks 507 for winching drill line or drill lines 512, a standpipe 508 that receives mud from the vibrating hose 506, a kelly hose 509 that receives mud from the standpipe 508, a gooseneck or goosenecks 510, a traveling block 511, a crown block 513 for carrying the traveling block 511 via the drill line or drill lines 512, a derrick 514, a kelly 518 or a top drive 540, a kelly drive bushing 519, a rotary table 520, a drill floor 521, a bell nipple 522, one or more blowout preventors (BOPs) 523, a drillstring 525, a drill bit 526, a casing head 527 and a flow pipe 528 that carries mud and other material to, for example, the mud tank 501.

In the example system of FIG. 5, a borehole 532 is formed in subsurface formations 530 by rotary drilling; noting that various example embodiments may also use one or more directional drilling techniques, equipment, etc.

As shown in the example of FIG. 5, the drillstring 525 is suspended within the borehole 532 and has a drillstring assembly 550 that includes the drill bit 526 at its lower end. As an example, the drillstring assembly 550 may be a bottom hole assembly (BHA).

The wellsite system 500 can provide for operation of the drillstring 525 and other operations. As shown, the wellsite system 500 includes the traveling block 511 and the derrick 514 positioned over the borehole 532. As mentioned, the wellsite system 500 can include the rotary table 520 where the drillstring 525 pass through an opening in the rotary table 520.

As shown in the example of FIG. 5, the wellsite system 500 can include the kelly 518 and associated components, etc., or the top drive 540 and associated components. As to a kelly example, the kelly 518 may be a square or hexagonal metal/alloy bar with a hole drilled therein that serves as a mud flow path. The kelly 518 can be used to transmit rotary motion from the rotary table 520 via the kelly drive bushing 519 to the drillstring 525, while allowing the drillstring 525 to be lowered or raised during rotation. The kelly 518 can pass through the kelly drive bushing 519, which can be driven by the rotary table 520. As an example, the rotary table 520 can include a master bushing that operatively couples to the kelly drive bushing 519 such that rotation of the rotary table 520 can turn the kelly drive bushing 519 and hence the kelly 518. The kelly drive bushing 519 can include an inside profile matching an outside profile (e.g., square, hexagonal, etc.) of the kelly 518; however, with slightly larger dimensions so that the kelly 518 can freely move up and down inside the kelly drive bushing 519.

As to a top drive example, the top drive 540 can provide functions performed by a kelly and a rotary table. The top drive 540 can turn the drillstring 525. As an example, the top drive 540 can include one or more motors (e.g., electric and/or hydraulic) connected with appropriate gearing to a short section of pipe called a quill, that in turn may be screwed into a saver sub or the drillstring 525 itself. The top drive 540 can be suspended from the traveling block 511, so the rotary mechanism is free to travel up and down the derrick 514. As an example, a top drive 540 may allow for drilling to be performed with more joint stands than a kelly/rotary table approach.

In the example of FIG. 5, the mud tank 501 can hold mud, which can be one or more types of drilling fluids. As an example, a wellbore may be drilled to produce fluid, inject fluid or both (e.g., hydrocarbons, minerals, water, etc.).

In the example of FIG. 5, the drillstring 525 (e.g., including one or more downhole tools) may be composed of a series of pipes threadably connected together to form a long tube with the drill bit 526 at the lower end thereof. As the drillstring 525 is advanced into a wellbore for drilling, at some point in time prior to or coincident with drilling, the mud may be pumped by the pump 504 from the mud tank 501 (e.g., or other source) via the lines 506, 508 and 509 to a port of the kelly 518 or, for example, to a port of the top drive 540. The mud can then flow via a passage (e.g., or passages) in the drillstring 525 and out of ports located on the drill bit 526 (see, e.g., a directional arrow). As the mud exits the drillstring 525 via ports in the drill bit 526, it can then circulate upwardly through an annular region between an outer surface(s) of the drillstring 525 and surrounding wall(s) (e.g., open borehole, casing, etc.), as indicated by directional arrows. In such a manner, the mud lubricates the drill bit 526 and carries heat energy (e.g., frictional or other energy) and formation cuttings to the surface where the mud (e.g., and cuttings) may be returned to the mud tank 501, for example, for recirculation (e.g., with processing to remove cuttings, etc.).

The mud pumped by the pump 504 into the drillstring 525 may, after exiting the drillstring 525, form a mudcake that lines the wellbore which, among other functions, may reduce friction between the drillstring 525 and surrounding wall(s) (e.g., borehole, casing, etc.). A reduction in friction may facilitate advancing or retracting the drillstring 525. During a drilling operation, the entire drillstring 525 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 526 of the drillstring 525 at a bottom of a wellbore, pumping of the mud commences to lubricate the drill bit 526 for purposes of drilling to enlarge the wellbore. As mentioned, the mud can be pumped by the pump 504 into a passage of the drillstring 525 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 525) may be transmitted uphole to an uphole device, which may relay such information to other equipment for processing, control, etc.

As an example, telemetry equipment may operate via transmission of energy via the drillstring 525 itself. For example, consider a signal generator that imparts coded energy signals to the drillstring 525 and repeaters that may receive such energy and repeat it to further transmit the coded energy signals (e.g., information, etc.).

As an example, the drillstring 525 may be fitted with telemetry equipment 552 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 5, an uphole control and/or data acquisition system 562 may include circuitry to sense pressure pulses generated by telemetry equipment 552 and, for example, communicate sensed pressure pulses or information derived therefrom for process, control, etc.

The assembly 550 of the illustrated example includes a logging-while-drilling (LWD) module 554, a measurement-while-drilling (MWD) module 556, an optional module 558, a rotary-steerable system (RSS) and/or motor 560, and the drill bit 526. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 554 may be housed in a suitable type of drill collar and can contain one or a plurality of selected types of logging tools. It will also be understood that more than one LWD and/or MWD module can be employed, for example, as represented at by the module 556 of the drillstring assembly 550. Where the position of an LWD module is mentioned, as an example, it may refer to a module at the position of the LWD module 554, the module 556, etc. An LWD module can include capabilities for measuring, processing, and storing information, as well as for communicating with the surface equipment. In the illustrated example, the LWD module 554 may include a seismic measuring device.

The MWD module 556 may be housed in a suitable type of drill collar and can contain one or more devices for measuring characteristics of the drillstring 525 and the drill bit 526. As an example, the MWD tool 554 may include equipment for generating electrical power, for example, to power various components of the drillstring 525. As an example, the MWD tool 554 may include the telemetry equipment 552, for example, where the turbine impeller can generate power by flow of the mud; it being understood that other power and/or battery systems may be employed for purposes of powering various components. As an example, the MWD module 556 may include one or more of the following types of measuring devices: a weight-on-bit measuring device, a torque measuring device, a vibration measuring device, a shock measuring device, a stick slip measuring device, a direction measuring device, and an inclination measuring device.

FIG. 5 also shows some examples of types of holes that may be drilled. For example, consider a slant hole 572, an S-shaped hole 574, a deep inclined hole 576 and a horizontal hole 578.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 5, the wellsite system 500 can include one or more sensors 564 that are operatively coupled to the control and/or data acquisition system 562. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 500. As an example, a sensor or sensor may be at an offset wellsite where the wellsite system 500 and the offset wellsite are in a common field (e.g., oil and/or gas field).

As an example, one or more of the sensors 564 can be provided for tracking pipe, tracking movement of at least a portion of a drillstring, etc.

As an example, the system 500 can include one or more sensors 566 that can sense and/or transmit signals to a fluid conduit such as a drilling fluid conduit (e.g., a drilling mud conduit). For example, in the system 500, the one or more sensors 566 can be operatively coupled to portions of the standpipe 508 through which mud flows. As an example, a downhole tool can generate pulses that can travel through the mud and be sensed by one or more of the one or more sensors 566. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 500 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

FIG. 6 shows an example of an environment 601 that includes a subterranean portion 603 where a rig 610 is positioned at a surface location above a bore 620. In the example of FIG. 6, various wirelines services equipment can be operated to perform one or more wirelines services including, for example, acquisition of data from one or more positions within the bore 620.

In the example of FIG. 6, the bore 620 includes drillpipe 622, a cable side entry sub (CSES) 623, a casing shoe 624, a wet-connector adaptor 626, and an openhole section 628. As an example, the bore 620 can be a vertical bore or a deviated bore where one or more portions of the bore may be vertical and one or more portions of the bore may be deviated, including substantially horizontal.

In the example of FIG. 6, the CSES 623 includes a cable clamp 625, a packoff seal assembly 627, and a check valve 629. These components can provide for insertion of a logging cable 630 that includes a portion 632 that runs outside the drillpipe 622 to be inserted into the drillpipe 622 such that at least a portion 634 of the logging cable runs inside the drillpipe 622. In the example of FIG. 6, the logging cable 630 runs past the wet-connect adaptor 626 and into the openhole section 628 to a logging string 640.

As shown in the example of FIG. 6, a logging truck 650 (e.g., a wirelines services vehicle) can deploy the wireline 630 under control of a system 660. As shown in the example of FIG. 6, the system 660 can include one or more processors 662, memory 664 operatively coupled to at least one of the one or more processors 662, instructions 666 that can be, for example, stored in the memory 664, and one or more interfaces 668. As an example, the system 660 can include one or more processor-readable media that include processor-executable instructions executable by at least one of the one or more processors 662 to cause the system 660 to control one or more aspects of equipment of the logging string 640 and/or the logging truck 650. In such an example, the memory 664 can be or include the one or more processor-readable media where the processor-executable instructions can be or include instructions. As an example, a processor-readable medium can be a computer-readable storage medium that is not a signal and that is not a carrier wave.

FIG. 6 also shows a battery 670 that may be operatively coupled to the system 660, for example, to power the system 660. As an example, the battery 670 may be a back-up battery that operates when another power supply is unavailable for powering the system 660 (e.g., via a generator of the wirelines truck 650, a separate generator, a power line, etc.). As an example, the battery 670 may be operatively coupled to a network, which may be a cloud network. As an example, the battery 670 can include smart battery circuitry and may be operatively coupled to one or more pieces of equipment via a SMBus or other type of bus.

As an example, the system 660 can be operatively coupled to a client layer 680. In the example of FIG. 6, the client layer 680 can include features that allow for access and interactions via one or more private networks 682, one or more mobile platforms and/or mobile networks 684 and via the "cloud" 686, which may be considered to include distributed equipment that forms a network such as a network of networks. As an example, the system 660 can include circuitry to establish a plurality of connections (e.g., sessions). As an example, connections may be via one or more types of networks. As an example, connections may be client-server types of connections where the system 660 operates as a server in a client-server architecture. For example, clients may log-in to the system 660 where multiple clients may be handled, optionally simultaneously.

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

As an example, data can include geochemical data. For example, consider data acquired using X-ray fluorescence (XRF) technology, Fourier transform infrared spectroscopy (FTIR) technology and/or wireline geochemical technology.

XRF technology involves emission of characteristic "secondary" (or fluorescent) X-rays from a material that has been excited by bombardment with high-energy X-rays or gamma rays. XRF technology may be implemented for elemental analysis and chemical analysis, for example, as to research in geochemistry. As an example, in core analysis, XRF technology may be implemented to help determine mineral content. For example, elemental volumes may be inverted to mineral volumes by assuming certain standard formulae for mineral composition.

FTIR technology can involve analysis of an infrared spectrum of absorption, emission, photoconductivity or Raman scattering of a solid, liquid or gas. As an example, FTIR may be applied as a technique for quantitative mineralogical analysis of a sample of rock by measuring the effect of midrange infrared radiation transmitted through the sample. In such an example, the radiation excites vibrations in the chemical bonds within the mineral molecules at particular frequencies characteristic of each bond. The transmitted radiation may be compared with spectral standards for a variety of minerals, for example, to determine abundance of one or more minerals in the sample. As to sample preparation, consider, as an example, grinding a core plug to provide a representative sample that may be dispersed in a potassium bromide matrix and then subject to measurement and analysis.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by SLB (Houston, Texas). As an example, a LITHO SCANNER tool may be a gamma ray spectroscopy tool. As an example, a workflow may include emission of neutrons by a pulsed neutron generator (PNG) of a tool to induce emission of gamma rays from a formation via interactions such as inelastic scattering interactions and thermal neutron capture interactions, which can produce gamma rays with a specific set of characteristic energies. In turn, gamma rays may be detected by a $LaBr_3$:Ce scintillator coupled to a high-temperature spectroscopy photomultiplier, producing signals that can be integrated, digitized, and processed by a high-performance pulse-height analyzer. Such an analyzer may determine, for example, pulse height (proportional to energy) of individually detected gamma rays and accumulate pulse-height histograms (spectra) that tally counts versus pulse height. Spectra may be acquired, for example, during and after each neutron burst, which helps to enable separation of inelastic and capture gamma rays. As an example, an individual spectrum may be decomposed into a linear combination of standard spectra from individual elements, which can involve adjustment for one or more environmental and/or electronic factors. As an example, coefficients of linear combination of standard spectra may be converted to elemental weight fractions, for example, via a modified geochemical oxides closure model, an inversion approach, etc. As to interpretation, various approaches may be implemented to generate mineralogy and lithologic fractions from the elemental concentration logs. As an example, a sequential spectral lithographic processing approach may be used, which is based on the derivation of empirical relationships between elemental concentrations and mineral concentrations. As another example, an iterative inversion technique may be implemented (e.g., consider the TECHLOG QUANTI multicomponent inversion ELAN module).

As an example, a method may include acquiring data (e.g., and/or receiving data) as measured via one or more techniques. Such techniques may include a micro-resistivity technique, a density and photoelectric factor or index technique, an image calibration technique, a dielectric and conductivity dispersion technique, a neutron porosity technique, an ultrasound technique, etc.

As an example, a workflow may utilize geochemical data, and optionally other data, for one or more processes (e.g., stratigraphic modeling, basin modeling, completion designs, drilling, production, injection, etc.). As an example, lithology scanner tool data may be used in a workflow or workflows that implement one or more frameworks Table 1, below, shows some examples of data, which may be referred to as "log" data (e.g., well log data) that are associated with petrophysical and rock physics properties calculation and analysis.

TABLE 1

Examples of Log Data

| Name | Uses |
|---|---|
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (Al, Sl, σ, etc.) calculation, etc. |
| Neutron Porosity (NPHI) | Finding hydrocarbon bearing zone, porosity calculation, etc. |
| Sonic (DT) | Porosity calculation, wave velocity calculation, rock physics properties (Al, Sl, σ, etc.) calculation, etc. |
| Photoelectric (PEF) | Mineral determination (for lithology interpretation) |

FIGS. 1, 3, 4, 5 and 6 show various examples of equipment in various examples of environments where, for example, acquired data may be utilized in one or more frameworks. As an example, one or more workflows may be implemented to perform operations using equipment in one or more environments. As an example, a workflow may aim to understand an environment. As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

As an example, a system can provide, due in part to increasing data privacy and data residency requirements, more efficient and transparent management of data residency management. Data that are generated at the wellsite can be tainted and/or geo-localized (e.g., with GPS, country information, etc.). As an example, a system can track such data using, for example, one or more blockchain technologies.

A US Patent Application Publication, US 2020/0162260 A1, Blockchain Ledger for Persisting and Verifying Oil and Gas Events, to Boneti et al., is incorporated by reference herein, which describes methods, apparatuses, and computer-readable media for logging oil and gas events using a combination of a primary database that stores event data for an oil and gas event along with a blockchain ledger that stores one or more identifying characteristics of the event (e.g., a hash of the event data), thereby enabling the event data to be verified where, by utilizing the combination of a primary database and a blockchain ledger, the blockchain ledger is not required to store all of the data associated with an event, such that, where an oil and gas event is associated with a large volume of data, the size and thus the processing overhead associated with the blockchain ledger may be reduced.

As an example, a system can be implemented such that when data are transiting over a proprietary network the data are systematically checked versus one or more data conditions (e.g., consider a data residency restriction, etc.). As an example, one type of data condition can involve geofencing. For example, if data are sent and "received" outside an authorized country list, to receive the data, a user will be notified, and data will bounce back to the sender. Such an approach can help to prevent data from being stored on servers (e.g., consider the INTERACT framework servers, etc.), cloud platform servers (e.g., consider the DELFI environment, etc.) and/or soft drives (e.g., consider the ONEDRIVE, etc.) that are not compliant with one or more residency criteria.

As an example, an email client (e.g., OUTLOOK, etc.) can include code executable to check residency and remove potential attachments from emails. As an example, data may include information about an entity acquiring the data and owner details. As an example, a system can prevent data from being sent to an external network without a user being notified about a current owner. Such a system can allow an entity (e.g., proprietor of the system) to change an owner or owners, for example, if assets are changing ownership. As an example, geolocalization and data owner information can be stored in a way that if the data are fractioned such information is not lost. Such a scheme may be implemented in processing and/or in a post-acquisition application (e.g., consider MAXWELL, PETREL, TECHLOG, etc., SLB, Houston, Texas).

As an example, a system can handle proprietary data according to one or more conditions (e.g., consider copyright, patent or trade secret laws). As an example, a "smart" contract can be a digital contract that provides for specification and/or control of ownership. For example, a smart contract can provide for data ownership management (e.g., used when developing algorithms by 3rd parties, based on the data of a client or group of clients, etc.). A system can provide for transparent management of one or more proprietary aspects of a derived product developed from subsurface data. For example, consider acquisition of subsurface data from logging, drilling, etc., where a framework may operate on such data to generate derivative data, which may be considered to be a derived product (e.g., a work product of a workflow).

As mentioned, a system may utilize one or more blockchain technologies for one or more management tasks. For example, consider management of users as to secret wells data. As an example, a client can maintain a list of users that have access to data generated in the context of secret prospection. As an example, a user management database can be shared with an associate or a certain number of 3rd party service companies. Such data, through appropriate management, can be accessed after a user is entitled. In such an example, a chain can be consulted when a user tries to access or transform data. Blockchain technology can also permit creation of a history of how data were accessed and by whom and/or by what (e.g., what type of machine, what type of application/framework, etc.). As an example, new data generated from secret data can also be tagged and controlled using the same chain and/or a different chain. As an example, monetization can come from transparence of such user management and access control. Such a system can provide for generation of new business for data and/or provide for data to be sold as a service.

A blockchain can include a growing list of records, called blocks, that are linked together, for example, using one or more cryptographic techniques. As an example, each block may include a cryptographic hash of a previous block, a timestamp, and transaction data (e.g., generally represented as a Merkle tree). In such an example, the timestamp can help to prove that transaction data existed when the block was "published" in order to get into its hash. As blocks can each include information about a previous block, the blocks form a chain, with each additional block reinforcing the ones before it. In such an approach blockchains can be relatively resistant to modification of their data because once recorded, the data in a given block cannot be altered retroactively without altering all subsequent blocks.

In cryptography and computer science, a hash tree or Merkle tree is a tree in which every leaf (node) is labelled with the cryptographic hash of a data block, and every node that is not a leaf (called a branch, inner node, or inode) is labelled with the cryptographic hash of the labels of its child nodes. A hash tree allows efficient and secure verification of the contents of a large data structure. A hash tree is a generalization of a hash list and a hash chain.

The HYPERLEDGER fabric is an enterprise-grade, distributed ledger platform that offers modularity and versatility (Hyperledger Foundation). The modular architecture for HYPERLEDGER fabric can provide for plug and play components, such as consensus, privacy and membership services.

The HYPERLEDGER fabric is a permissioned blockchain infrastructure with a modular architecture that provides for delineation of roles between the nodes in the infrastructure, execution of smart contracts (e.g., chaincode)

and configurable consensus and membership services. A Fabric Network includes (1) peer nodes, which execute chaincode, access ledger data, endorse transactions and interface with applications; (2) orderer nodes, which ensure the consistency of the blockchain and deliver the endorsed transactions to the peers of the network; and (3) Membership Service Providers (MSPs), each generally implemented as a Certificate Authority, managing X.509 certificates which are used to authenticate member identity and roles. HYPERLEDGER fabric allows for use of different consensus algorithms (e.g., consider Practical Byzantine Fault Tolerance (PBFT), etc.). A document entitled HYPERLEDGER Architecture, Volume 1 (Iroha Whitepaper (Mar. 7, 2017), retrieved from https://github.com/HYPERLEDGER/iroha/blob/master /docs/iroha_whitepaper.md) is incorporated by reference herein. An article by Neisse et al., A Blockchain-based Approach for Data Accountability and Provenance Tracking, ARES '17: Proceedings of the 12th International Conference on Availability, Reliability and Security, August 2017 Article No.: 14, pages 1-10 (https://doi.org/10.1145/3098954.3098958) is incorporated by reference herein.

The HYPERLEDGER fabric can provide for integration in which a Distributed Ledger Technology (DLT) is utilized, which may offer no user facing services other than an SDK for NODE.JS, JAVA and GO languages. Fabric supports chaincode in GO and JAVASCRIPT (via HYPERLEDGER Composer, or natively since v1.1) out-of-the-box, and other languages such as JAVA by installing appropriate modules. Such language flexibility extends use beyond that of a closed smart contract language.

A smart contract is a computer program or a transaction protocol which may automatically execute, control or document legally relevant events and actions according to the terms of a contract or an agreement. A smart contract may reduce demand in trusted intermediators, arbitrations and enforcement costs, fraud losses, as well as the reduction of malicious and accidental exceptions.

In Fabric, chaincode is a program, written in GO, NODE.JS, or JAVA that implements a prescribed interface. Chaincode can run in a secured docker container isolated from an endorsing peer process. Chaincode initializes and manages ledger state through transactions submitted by applications. A chaincode may handle business logic agreed to by members of a network such that it may be considered as a "smart contract". A state created by a chaincode is scoped exclusively to that chaincode and not accessible directly by another chaincode. However, within a common network, given appropriate permission, a chaincode may invoke another chaincode to access its state.

Chaincode may be viewed from the perspective of an application developer developing a blockchain application/solution (e.g., chaincode for developers) or from the perspective of an operator (e.g., chaincode for operators), as oriented to a blockchain network operator that is responsible for managing a blockchain network, and that may leverage the HYPERLEDGER fabric API to install, instantiate, and upgrade chaincode (e.g., but may not be involved in the development of a chaincode application).

From an application developer's perspective, a smart contract, together with the ledger, can form the core of a HYPERLEDGER fabric blockchain system. Whereas a ledger holds facts about the current and historical state of a set of objects, a smart contract can define executable logic that generates new facts that are added to the ledger. A chaincode may be used by administrators to group related smart contracts for deployment, but can also be used for low level system programming of Fabric. Smart contracts and chaincode can co-exist. The HYPERLEDGER fabric may use the terms smart contract and chaincode interchangeably; noting that, in general, a smart contract defines the transaction logic that controls the lifecycle of an object included in a world state, which can be packaged into a chaincode that can be deployed to a blockchain network. Smart contracts can govern transactions; whereas, chaincode can govern how smart contracts are packaged for deployment.

Client data can be or include sensitive information that is expected to be handled appropriately, which may enhance or maintain managing entity's business and reputation. In various scenarios, a managing entity can be a service provider that may perform operational services such as field services that acquire data for a client or clients. In such an example, the managing entity may be expected to hold such data securely; however, opportunities can exist to leverage such data to the benefit of a client and/or the managing entity. For example, particular data may have initial value for a particular purpose of a client and then have secondary value, tertiary value, etc., for one or more others (e.g., one or more other clients of the managing entity, etc.). As an example, a system can provide for managing data in a manner that is beneficial to multiple entities, which may provide benefits as to resource utilization, resource management, regulatory compliance, etc.

As explained with respect to the examples of FIG. 5 and FIG. 6, wellbore data can be measured while and after drilling at least a portion of a well. Logs may be acquired on an open hole wellbore condition which may include computations and interpretations (e.g., derivative data). Such data may be useful for one or more purposes (e.g., primary, secondary, tertiary, etc.). As an example, one use may be for machine learning where such data can be utilized raw and/or transformed to train and/or test one or more machine learning models. As to frameworks that can provide for such training, consider the TENSORFLOW framework (Google LLC, Mountain View, CA), which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

Various types of scenarios can be limited due to availability and/or cost of data. As an example, a system that can provide for data tracking, including tracking of derivative data, can provide for increased utilization of one or more machine learning techniques. For example, such a system may be utilized to provide data for a particular limited purpose where such data and purpose can be tracked (e.g., using one or more blockchain technologies).

As explained, various frameworks may be utilized to acquire and/or process field data. For example, a client may transfer data from the field to a wellbore interpretation framework (e.g., TECHLOG, etc.) and/or a reservoir characterization framework (e.g., PETRL, etc.) though frameworks such as, for example, the INTERACT and STUDIO frameworks. As explained, such frameworks may be included in the DELFI environment. As an example, data may also be imported and/or exported from a project specific to a software and cloud application. While each framework may have its own history component system, a system can provide for managing and/or sharing histories of frameworks, for example, through frameworks. Such an approach can provide for, when importing the data into a project, accessing history of the data.

As explained, where data can be shared due to more effective management, entities may be less reluctant to share their data. As explained, a system can provide for increased trust and management such that an entity may even consider monetizing certain data to a competitor, which may be limited to what may be viewed as being a non-competitive purpose (e.g., a non-trusted actor that may reuse data for a different purpose, etc.).

As an example, a system can provide for putting one or more types of sensitive data together, while guaranteeing their privacy and ownership. Operations on sensitive data can demand a trusted environment. As explained, a system can provide for management using a blockchain technology-based infrastructure. As an example, a system can provide for discovery, reporting, etc., as to how data were used. For example, consider an entity monetizing data for use by another entity where a blockchain can be utilized to record how such data were used. Such an approach can be part of a smart contract approach that can provide assurances as to how data were utilized. Further, as mentioned, derivative data may be identified and appropriately tracked using a common blockchain and/or one or more auxiliary blockchains. As an example, a system can provide for various uses of data (e.g., wellbore interpretation, reservoir characterization, etc.) where the system can track how such data are stored, processed and/or transmitted.

As an example, a system can offer transparency and traceability of transactions on field data and/or derivative data. As an example, such a system may be integrated with an environment such as the DELFI environment which offers a number of frameworks that can utilize data and/or generate derivative data.

As an example, a system can leverage blockchain protocols in oil and gas related applications (e.g., frameworks, etc.), for efficient management of client data, ensuring transparency, ownership and access control to data sensitive information.

Blockchain characteristics can include decentralization and transparency, which can provide for traceability of data. As an example, a system can provide a decentralized and distributed history of data (e.g., field data and derivatives thereof) via blockchain technology.

As an example, a system may utilize one or more types of blockchain technologies. As mentioned, a system may provide for monetization where payments may be via a peer-to-peer digital cash or cryptocurrency. Blockchain algorithms enable Bitcoin transactions to be aggregated in blocks, which are added to a chain of existing blocks using a cryptographic signature. In Bitcoin, however, trust is derived from an approach referred to as proof of work, which is a distributed consensus-based approach to trust.

As explained, a system may utilize blockchain technology to implement smart contracts (e.g., self-enforcing smart contracts, etc.). For example, where an entity subscribes to a smart-contract, its execution is not avoidable, and one or more party entities can be sure that this smart-contract is rigorously executed in the terms defined. In such a system, an entity does not need to trust the actors as the protocol is preventing them from doing things differently.

In the HYPERLEDGER platform, the architecture includes a consensus layer that is responsible for generating an agreement on an order and confirming the correctness of the set of transactions that constitute a block; a smart contract layer that is responsible for processing transaction requests and determining if transactions are valid by executing logic; a communication layer that is responsible for peer-to-peer message transport between the nodes that participate in a shared ledger instance; a data store abstraction that allows different data-stores to be used by other modules; a crypto abstraction that allows different crypto algorithms or modules to be swapped out without affecting other modules; identity services that enables the establishment of a root of trust during setup of a blockchain instance, the enrollment and registration of identities or system entities during network operation, and the management of changes like drops, adds, and revocations (e.g., also providing for authentication and authorization); policy services that are responsible for policy management of various policies specified in the system, such as the endorsement policy, consensus policy, or group management policy (e.g., interfaces and depends on other modules to enforce the various policies); APIs that enables clients and applications to interface to blockchains; and interoperation that supports the interoperation between different blockchain instances.

As to consensus, it is a process by which a network of nodes provides a guaranteed ordering of transactions and validates the block of transactions. Consensus provides functionality to confirm the correctness of transactions in a proposed block, according to endorsement and consensus policies; to agree on order and correctness and hence on results of execution (implies agreement on global state); and to interface and depend on a smart contract layer to verify correctness of an ordered set of transactions in a block.

The operating assumption for HYPERLEDGER developers is that blockchain networks will operate in an environment of partial trust where a standard proof of work consensus approach with anonymous miners is not expressly implemented. As explained, proof of work can impose substantial cost in terms of resources and time, which can be sub-optimal in various time sensitivity blockchain networks.

Figure 7:
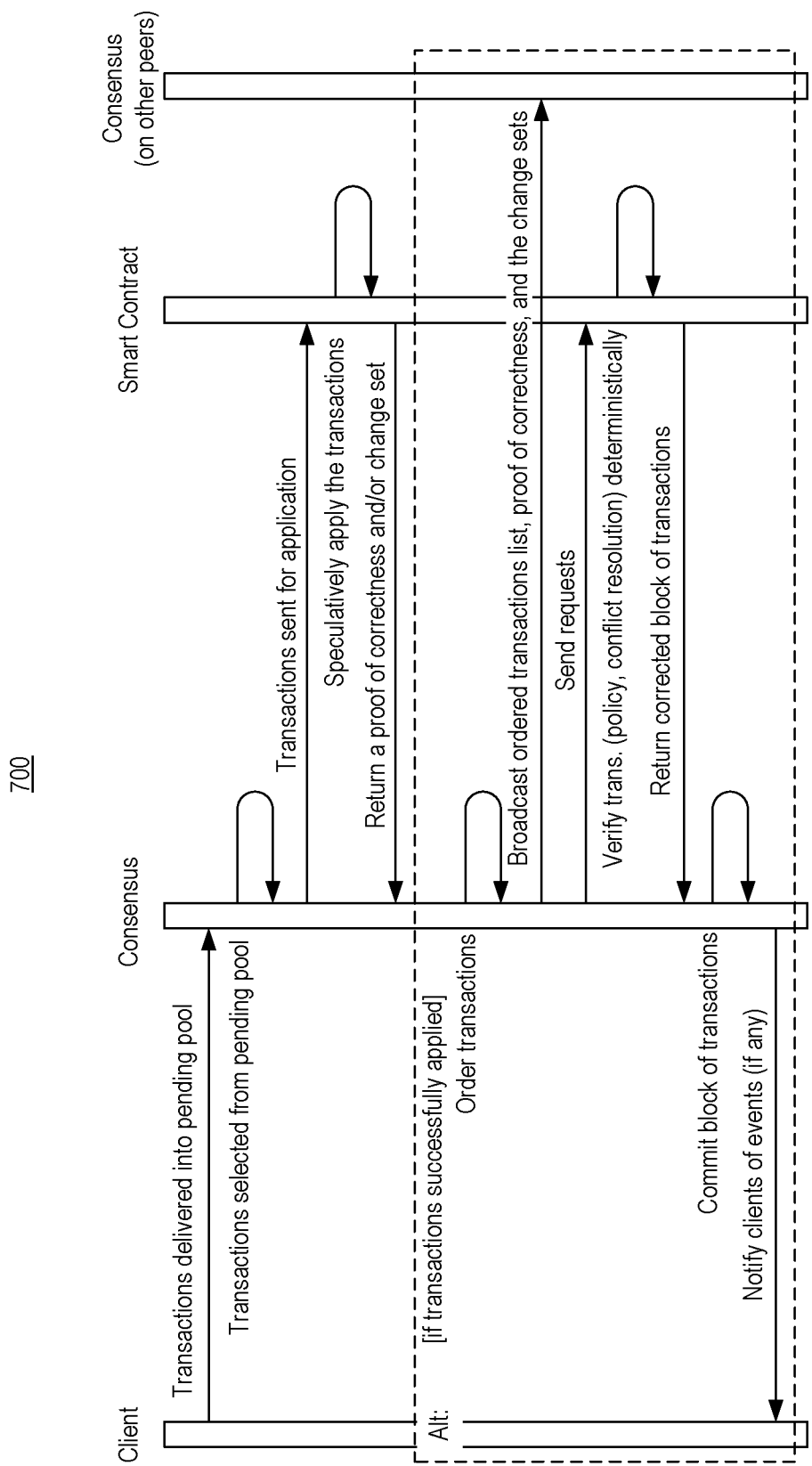
FIG. 7 illustrates an example of a method.

FIG. 7 shows an example schematic 700 of how consensus may be implemented in a peer network that involves a smart contract. As an example, consensus can involve endorsement driven by policy (e.g., m out of n signatures) upon which participants endorse a transaction; an ordering phase that accepts the endorsed transactions and agrees to the order to be committed to the ledger; and validation that takes a block of ordered transactions and validates the correctness of the results, including checking endorsement policy and double-spending.

Figure 8:
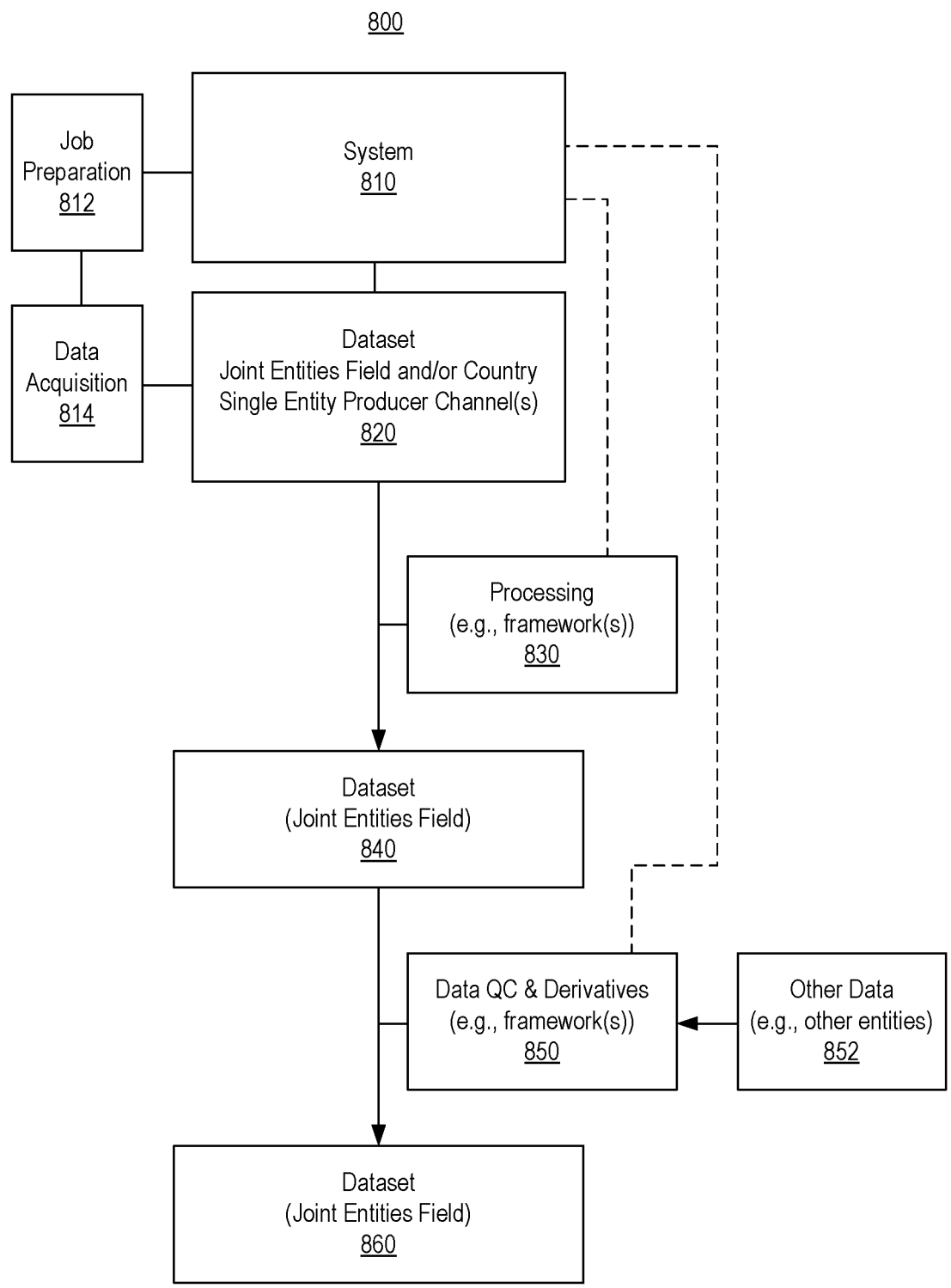
FIG. 8 illustrates an example of a workflow.

FIG. 8 shows an example of a workflow 800 with respect to a system 810 where the workflow 800 provides for data traceability. As shown, the workflow 800 can involve job preparation 812 and data acquisition 814 where a dataset 820 is generated, which may be via joint entities of a field and/or a country with a single entity producer channel(s). As shown, processing 830 can occur via one or more frameworks such that a processed data set 840 is generated. The workflow 800 can involve one or more data quality control (QC) and/or derivative processes 850, which may optionally integrate other data 852. As shown, a final dataset 860 can be generated via the workflow 800. In such an example, the system 810 can provide for tracking of one or more processes such that data traceability is established as to the datasets 820, 840 and 860.

In the example of FIG. 8, the datasets 820, 840 and 860 may be operated upon using one or more frameworks such as, for example, one or more frameworks of an overarching environment (see, e.g., FIG. 1).

As explained, a system can utilize a decentralized infrastructure based on blockchain technology, allowing industry operators to access data while certifying transparency, traceability and ownership of transactions. As explained, smart contracts can help to ensure efficient credible transactions without having to access one or more third parties. As explained, a system can provide for an auditable transaction history.

As to ownership, it may be transferred safely, being managed with guarantees of certified work history. A chaincode approach with smart indexing can allow permissions management and auditable transactions.

As an example, a system can provide for rendering of one or more graphical user interfaces (GUIs) that can allow for tasks such as allowing a user to upload, edit, download, and visualize sets of data, optionally with visibility on data history.

FIG. 9 shows an example GUI 900 that includes fields for client name, data owner, creation date, classification(s), purpose of usage, etc. Such a GUI can provide for entry of information for one or more types of data to be tracked via a system. The GUI 900 may be utilized as a form that is displayed where a user can enter mandatory and optional fields, such as Company Name, Data Classification (e.g., Customer Development, Customer Secret. Customer Public, etc.), Country of Origin of the data, Client Agreement, data files in various industry formats such as DLIS, XML, CSV, LAS. As an example, a system can display an error message if the mandatory fields are not correctly filled. As an example, a system can provide features such that a user can create new entries, edit or delete existing ones, a user can search a data entry using various keywords, such expiration date, client name, existing agreement or classification, a user can filter the data by alphabetical order, size of attachment or date, etc.

Figure 10:
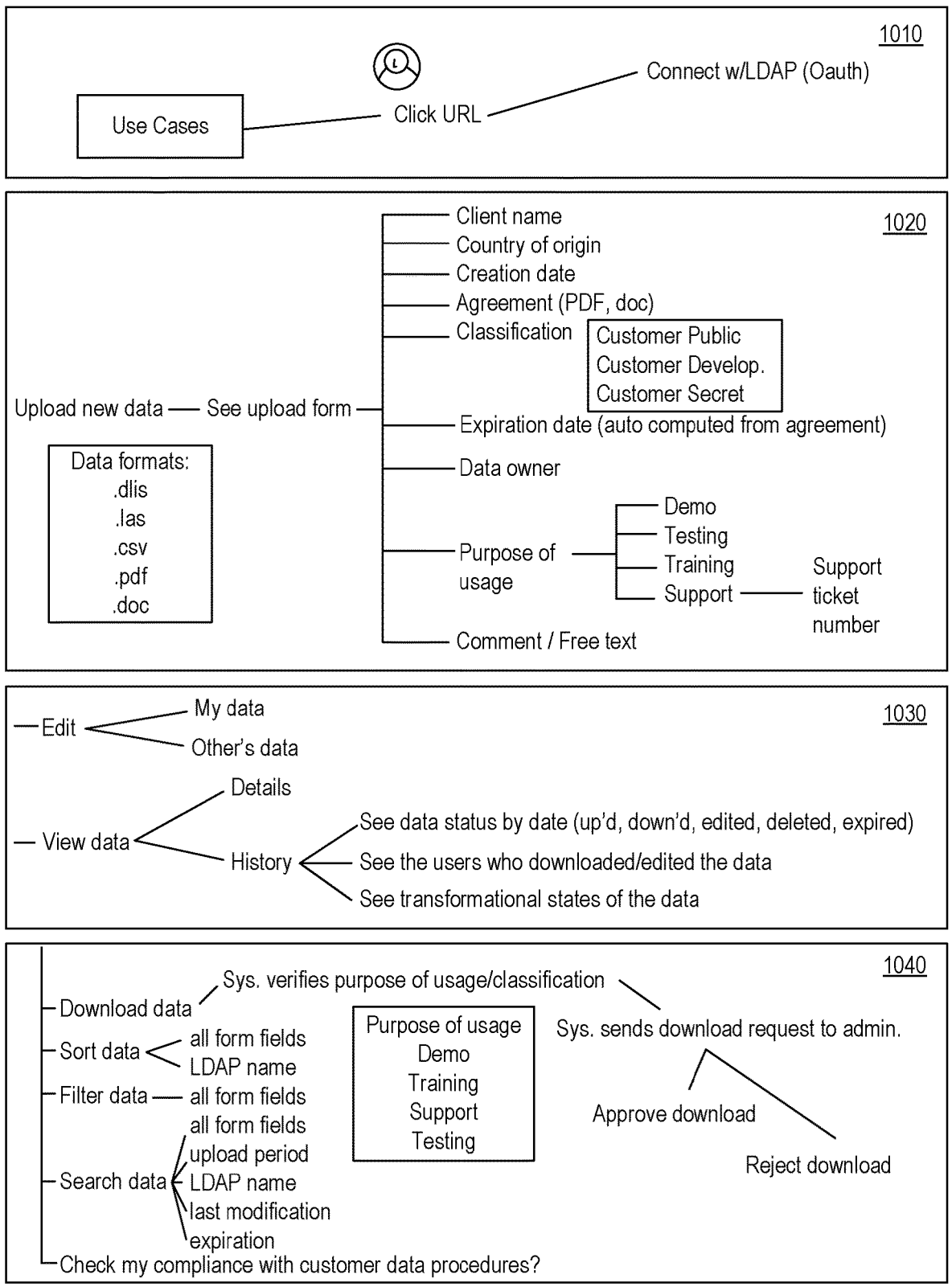
FIG. 10 illustrates examples of workflows.

FIG. 10 shows example workflows 1010, 1020, 1030 and 1040. In the workflow 1010, various use cases may be accessed by an entity such that a connection may be made with a Lightweight Directory Access Protocol (LDAP) system (e.g., with an authorization framework such as the open authorization (OAuth) framework, etc.). In the workflow 1020, various aspects of data upload may be managed, including various purposes of usage, expiration dates, agreements, etc. In the workflow 1030, various aspects may be edited and/or viewed. For example, consider viewing one or more historical aspects of information. In the workflow 1040, data may be downloaded, utilized in the cloud, sorted, filtered, search, compliance checked, etc.

FIG. 11 shows example GUIs 1110 and 1120. As shown, the GUI 1110 can provide a data album that can be rendered to a display, for example, on an application front-end where a user can easily navigate and visualize the data entries. In such an example, each data entry can include information such as data classification, client name, data owner, creation and expiry date. As to the GUI 1120, a user can hover over a data entry graphic and select one action within download, edit, open data or see history.

Figure 12:
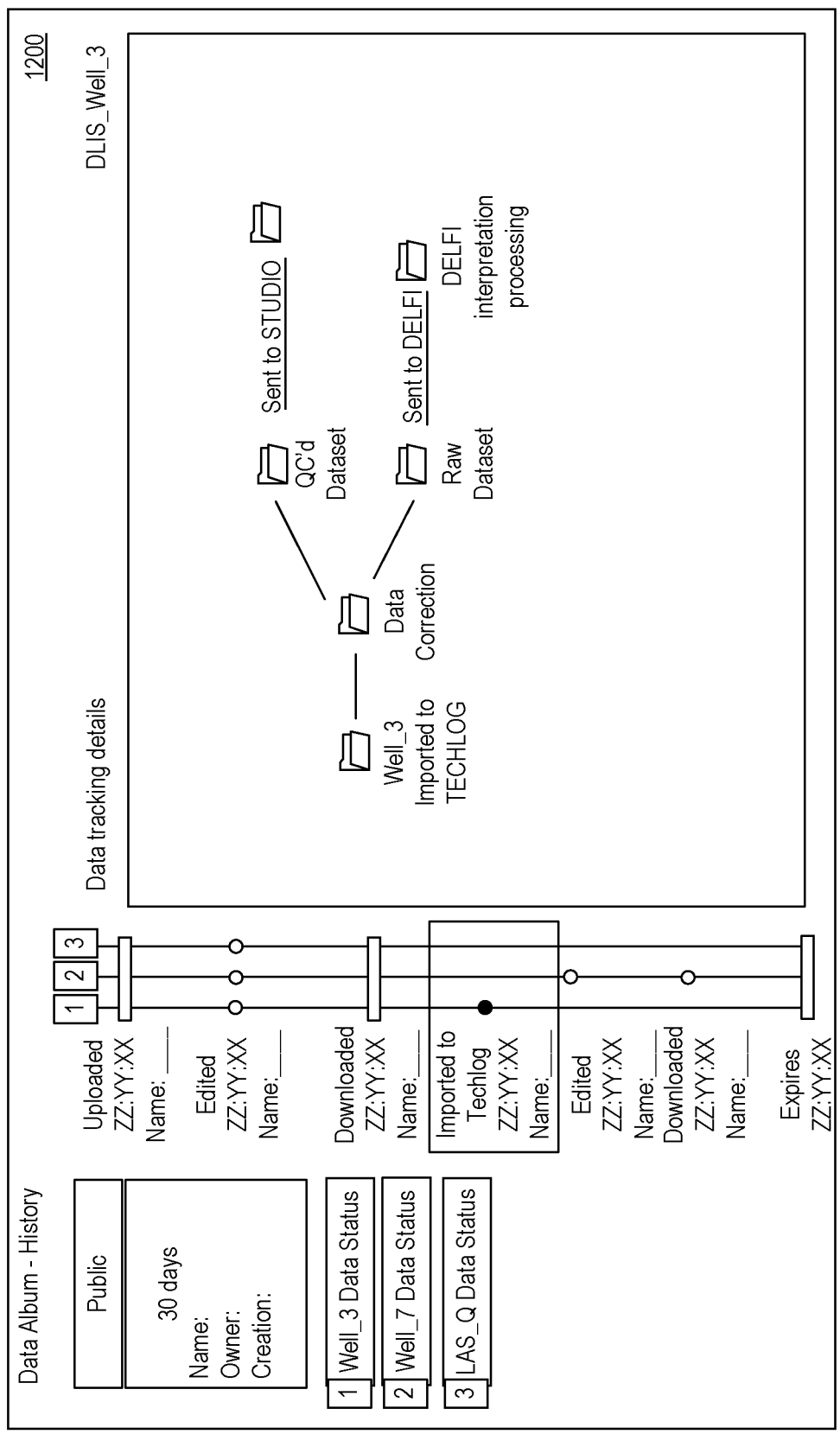
FIG. 12 illustrates an example of a graphical user interface.

FIG. 12 shows an example GUI 1200 that provides for history visualization. As explained, blockchain technology can allow for tracking transactions and knowing a complete data history. As shown, the GUI 1200 can provides specific functionality where a user can visualize the history of each dataset and track multiple processing phases applied on the data of interest (e.g., including derivative data, etc.). Such an approach can operate as a type of Global Positioning System (GPS), interconnected to various domain applications and infrastructures where the data are used or modified, tracking and recording data transactions and displaying such transaction information back to a user via a web application, etc. In the example of FIG. 12, quality control (QC) processes can be visualized along with transmission (e.g. access by) an environment such as the DELFI environment where one or more frameworks may process the data. In such an example, as further data processing occurs, which may generate derivative data, such actions and data may be further tracked and added to a history. As an example, a search feature can provide for searching history based on criteria such as type of framework, derivative status, etc. For example, consider searching for derivative data generated by the PETREL platform.

As shown in the example of FIG. 12, parallel tracks can be rendered to the GUI 1200 for different sets of data, as may be labeled 1, 2, and 3. The tracks can be organized as a timeline, which may be rendered vertically and/or horizontally. As shown, one event corresponds to data labeled 1 (e.g., Well_3) being imported to the TECHLOG framework. In a data tracking details panel, these data are shown as being subjected to data correction where a quality controlled dataset can be transmitted to the STUDIO framework and where a raw dataset can be transmitted to the DELFI environment, for example, for purposes of interpretation processing (e.g., consider using the PETRL framework for interpretation of data that may include log data, etc.). At the end of the parallel tracks, a block indicates an expiration date. As shown, a system can generate a GUI or GUIs that can provide for data tracking, data assessment, contract terms evaluation, etc. Further, one or more users of a framework may be notified as to an expiration date, which may indicate that one or more workflows are to be completed by that date. As an example, the GUI 1200 can be dynamic such that it automatically renders information responsive to one or more actions taken with respect to data, optionally indicating whether an attempt was made that violates one or more digital contractual terms. A GUI such as the GUI 1200 may provide for rendering of team information where a team is to collaborate on a project, which may be, for example, a multi-entity team that includes team members in different geographic locations. As explained, a system can provide for handling geographic restrictions and entity restrictions (see, e.g., FIG. 13).

As explained, upon expiry, data can be prevented from being transmitted, processed, etc., where, for example, derivative data may include one or more restrictions per a digital smart contract approach. The example of FIG. 12 is for one of the entry rendered in the GUI 1110 and the GUI 1120 of FIG. 11; noting that a system can allow for selection of one or more other entries, which may be selected on one or more bases, for example, using search and/or other system features (see, e.g., features including creation date and agreement features of the GUI 1110).

Figure 13:
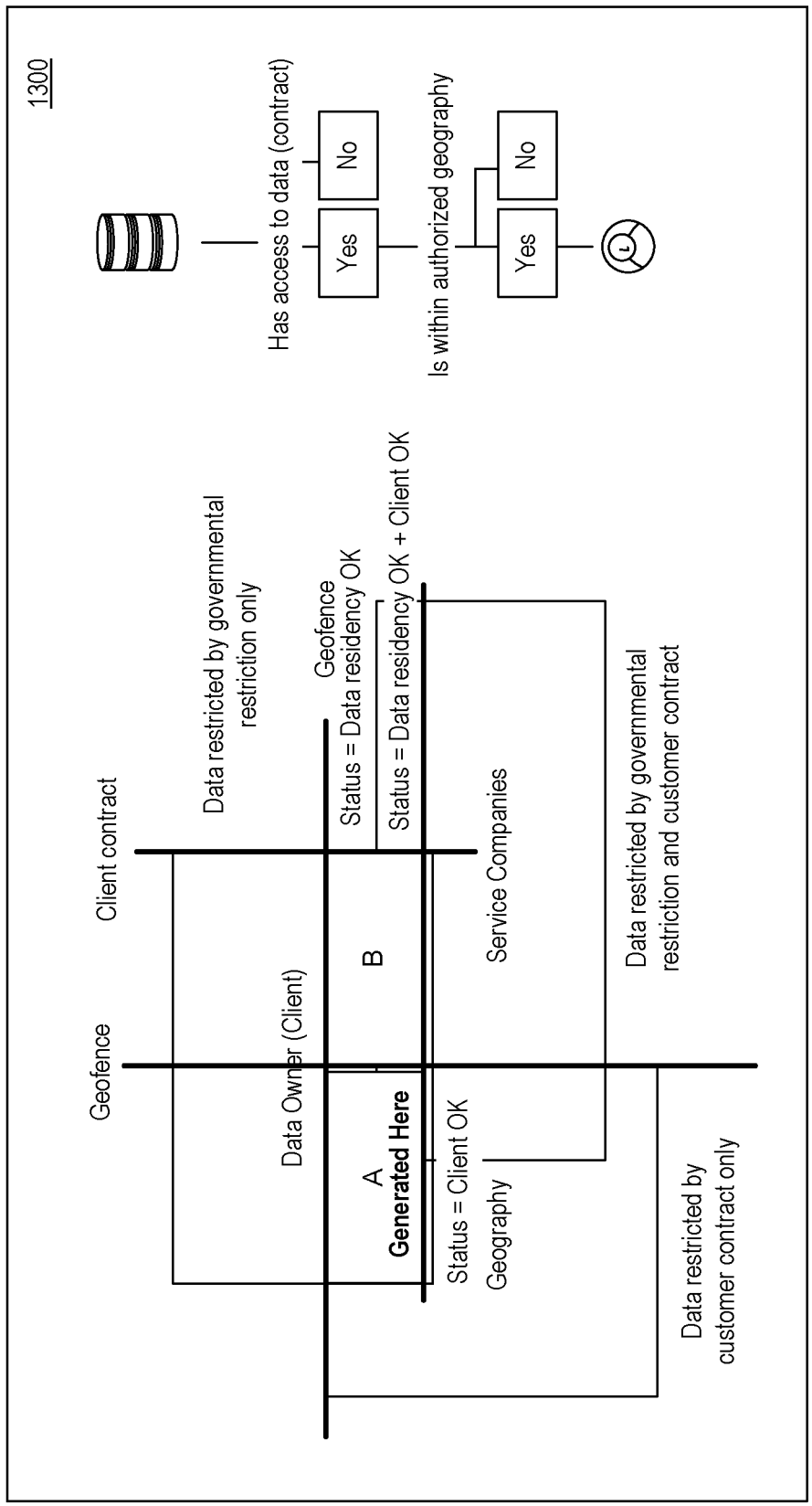
FIG. 13 illustrates an example of a graphical user interface.

FIG. 13 shows an example GUI 1300 that illustrates various geofencing related processes and information. As explained, if data are sent and "received" outside an authorized country list, to receive the data, a user will be notified, and data will bounce back to the sender. As an example, the GUI 1300 may be interactive in that it can access digital contractual information and/or in that it can set digital contractual terms. For example, consider dragging and dropping lines, boxes, etc., as to geofencing, entities, etc. As an example, the GUI 1300 can indicate where data are generated and, for example, indicate where data can be utilized. The GUI 1300 also includes a decision diagram that can be rendered to determine or show how a particular user (e.g., entity, etc.) has access to data, permission to handle data, etc. As an example, such a diagram may be rendered in association with one or more other GUIs, for example, consider rendering such a diagram in association with the GUI 1200 of FIG. 12.

Figure 14:
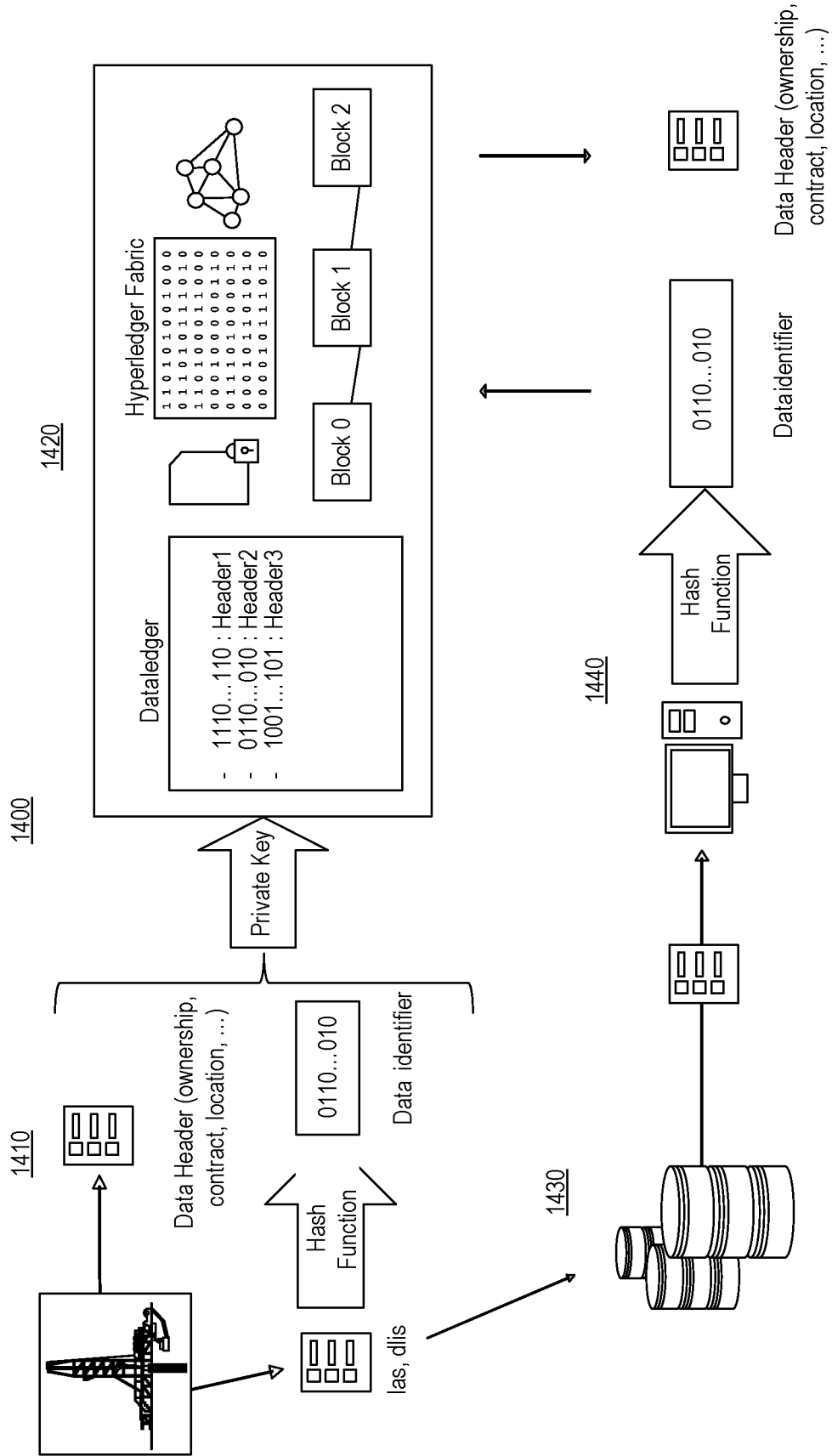
FIG. 14 illustrates an example of a system.

FIG. 14 shows an example of a system 1400 with various features that can be part of the system 1400 or operatively coupled to the system 1400. As shown, acquisition features 1410 can provide for data generation where data can be entered into a dataledger and HYPERLEDGER 1420 and/or stored in one or more databases 1430. For example, acquired data can be added to a ledger via a private key where such data may be stored in an encrypted form in one or more of the one or more databases 1430. As shown, via access features 1440, a hash function can be utilized for extracting a data identifier that can be utilized by the components 1420 to provide for access to various information (e.g., data header info, etc.). As shown in the example of FIG. 14, the HYPERLEDGER fabric may be utilized where a blockchain is created and managed.

As to types of blockchains, there may be public, federated and private and there may be permissioned and permissionless. As mentioned, various types of consensus mechanisms exist: proof of work vs proof of stake vs elapsed time, anonymous vs pseudonymous vs known identities. Furthermore, a wide spectrum of approaches to implement blockchain protocols or other distributed ledger technologies exist (e.g., blockchain as a service (BaaS), blockchain first, development platforms, vertical solutions, APIs and overlays.

As an example, a system can provide for management of decentralized oil and gas data. Such a system can provide for assurances that information remains safe, that data are appropriately identified, that one or more confidentiality constraints are imposed.

While the HYPERLEDGER fabric is mentioned, one or more other technologies can be implemented. For example, consider the ETHEREUM blockchain platform, which allows for development of smart contract and decentralized applications. In contrast, the HYPERLEDGER fabric is more complex and allows for tracing history of data such as field data from disparate sources.

As an example, the HYPERLEDGER Composer can be implemented by a system as a toolset and framework to build blockchain networks on top of the HYPERLEDGER fabric. In such an approach, a blockchain application can be built where, for example, a REST API server can allow client applications to transact with a blockchain service. As explained, a web application can provide a browser-friendly interface that allows for interactions. As an example, such an application may be integrated with one or more features shown in FIG. 1.

As explained, blockchain technology can provide for transparency and efficiency. The sharing of digital blockchain information as can be beneficial in joint operating agreements could reduce demand for reconciliation between oil and gas companies and for data hubs controlled by third parties.

A system can implement blockchain technology that provides the ability for parties that do not necessarily trust each other to transact without resorting to an intermediary. As an example, one or more private blockchains can be implemented to support structures of entities that demand distributed immutable data ledger without exposing it to public.

Figure 15:
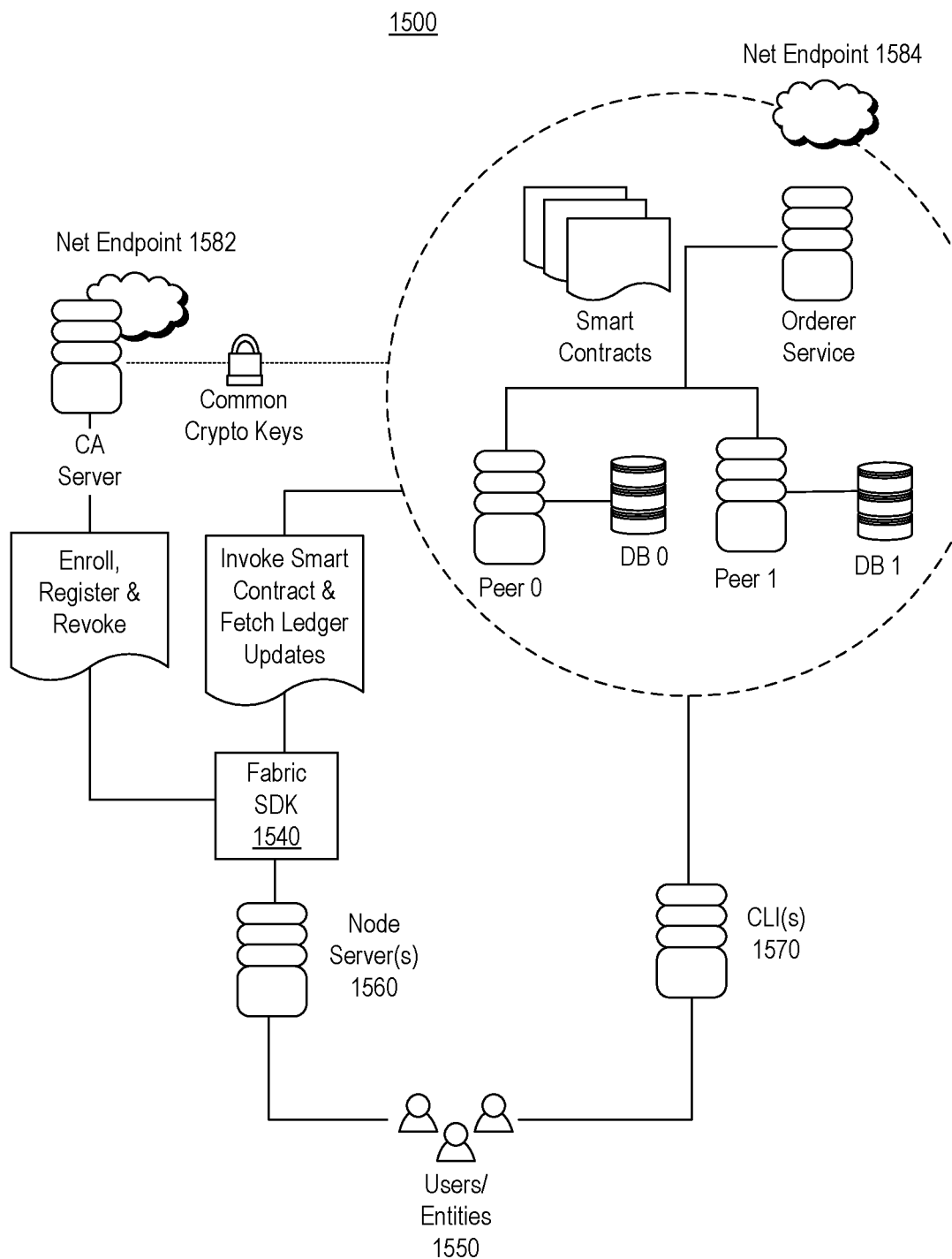
FIG. 15 illustrates an example of a system.

FIG. 15 shows an example of a system 1500 where various features can be integrated. As shown, the Fabric SDK 1540 may be utilized for access to users/entities 1550 via a node server or node servers 1560 and/or one or more command line interpreters (CLIs) 1570. As shown, various features can provide for peer-to-peer interactions. As shown, various network endpoints 1582 and 1584 can be provided by the system 1500.

As an example, a workflow for a client can include, the client connects to a mobile app, the client clicks on "Create a new entry" and a form is displayed where there are mandatory fields, such as: Company name; Classification—CD (Customer Development)—CS (Customer Secret) CP (Customer Public); Country of Origin; Release agreement; Data files; Date of receipt; Expiry date; Company contacts email address. In such an example, there can be one or more optional fields such as: Company contacts name; Well name; Description; Region of Origin: Europe, Russia Central Asia, Latin America, North America, Asia/Pacific, Africa; etc. In such an example, once finished, the client clicks on OK. If the client did not fill the mandatory fields an error message can be rendered. Once everything is acceptable, then the user can click OK and the entry can be created in a front-end accessible for the user with the information entered. In the front end, the client will be able to edit, delete and create new or existing entries.

As an example, via a front-end interface, a user can click on a send button to create a new entry in a catalog. In such an example, a form can open with mandatory fields. In such an example, once the mandatory fields are created an OK button can be activated. In such an example, clicking on OK causes the form to be closed and the new entry created.

As to editing, a front-end interface can provide for selecting an entry in order to modify it. For example, consider a checkbox to select to be able to edit it. In such an approach, a form can be opened and, once complete, an OK button can be actuated where a list is updated. As an example, an attachment may be deleted and/or a new attachment added.

As explained, a system can provide for search. For example, consider a search bar that can be enabled. In such an example, search may works as by keyword meaning that when a user starts typing there is an automatic update of the list with what is written inside the search bar. As an example, such a feature may be integrated with a search function of an environment, a framework, etc. As an example, an environment, a framework, etc., may be subscription-based (e.g., via license or licenses). In such an example, a search function may be enabled via permission (e.g., a valid subscription, license, etc.).

As an example, a filter mechanism may be provided, for example, to filter data per column by clicking on a column name. For example, consider filtering by alphabetical order, by size of attachment, by date, by type of framework, etc. As an example, filtering may be enhanced.

Figure 16:
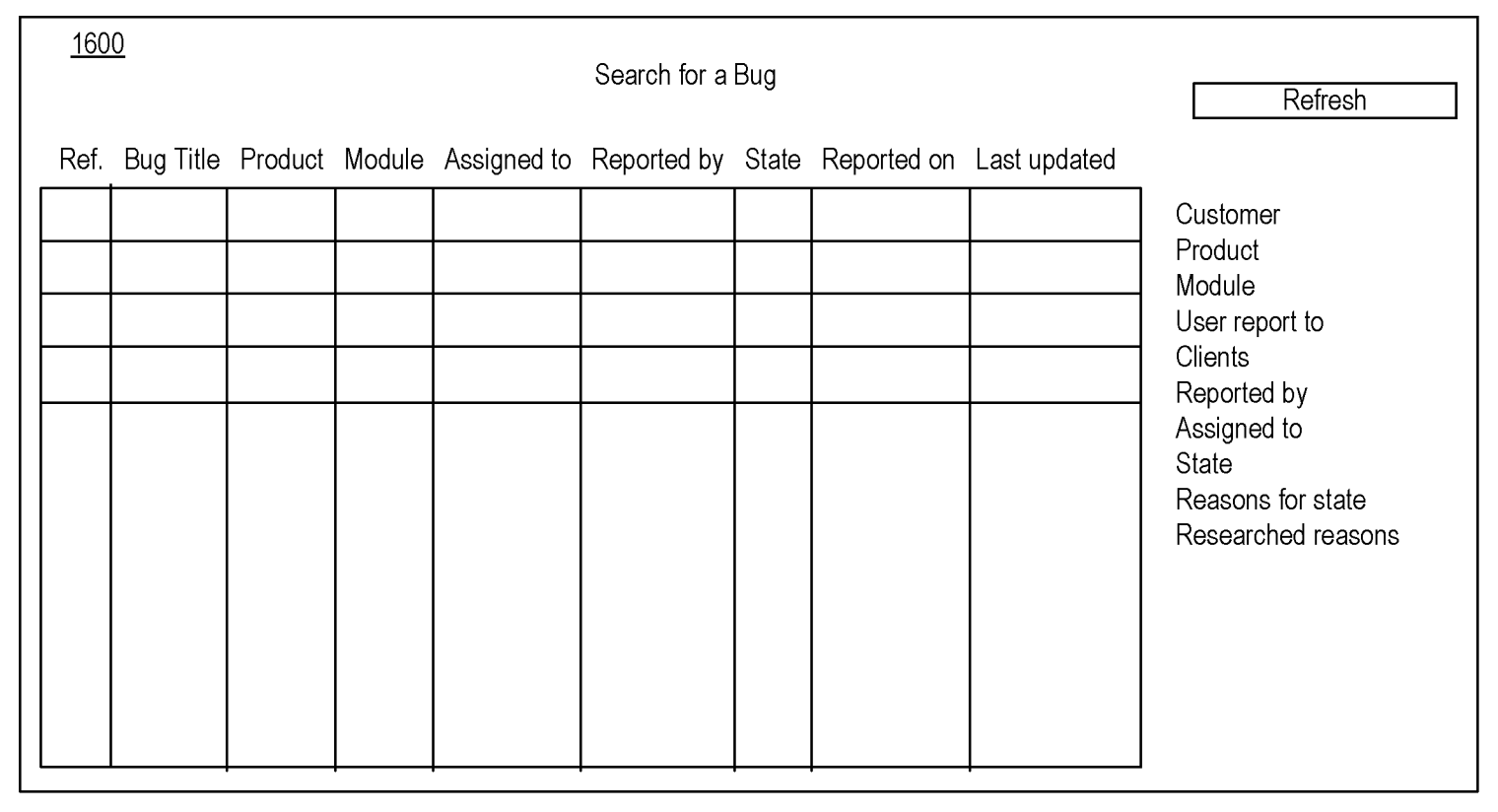

FIG. 16 shows an example of a GUI 1600 that provides various filtering functionalities. In the example of FIG. 16, various types of information may be rendered, which may pertain to a field, fields, a site, etc.

As an example, a system can provide for workflows for a customer data librarian. For example, once a user completes a form and clicks OK for creating an entry, a data librarian (DL) component can receive a notification to review and approve the customer. In such an example, once approved the customer can receive a notification. If not, the DL can contact the user using the email address, the DL and the customer can modify the entry to fit with appropriate information until it is acceptable.

As an example, a DL can have another front-end with visibility of entries from different clients. As an example, a DL can have read/write access to a catalog. In such an example, various fields can be common to those of a user front-end. For example, consider an ability to click on a send button to create a new entry in the catalog. As to edits, consider selecting an entry in order to modify it where there may be a checkbox to select to be able to edit it. In such an example, a form can be opened where, once completed, a click on OK can assure that a list is updated.

As to deletions, consider selecting one or several entries in the list and then clicking on a delete button where a pop-up message provides for confirmation. As explained, where one or more modifications are made (e.g., recorded), one or more notifications can be issued.

As to a workflow for a technology center engineer, consider using data from a client to test a specific workflow. In such an example, a DL can provide the engineer access to a specific entry. Once access is granted, the engineer can download the data and use it in a framework (e.g., TECHLOG, etc.). In such an example, a system can utilize a blockchain to record one or more actions of the workflow. For example, consider (i) access given by the DL, (ii) download, (iii) usage in a framework (e.g., deletion inside in the framework and in the machine or cloud resource once the test is completed), etc. In such an example, the engineer may be isolated (e.g., walled off, etc.) from the client where interaction with the client is via the DL.

As an example, a system can utilize a blockchain to identify an expiry date and send a notification to a DL to renew, if appropriate, a customer data librarian, etc.

As an example, a system can utilize a blockchain to verify whether particular data is quality controlled (QC'd). For example, in various instances non-QC'd data may be inaccessible to particular entities. As explained, data that are quality controlled may be derivative data where corresponding raw data are also registered to a blockchain. For example, in various instances raw data may be unavailable and/or not registered to a blockchain for one or more reasons. As to quality control, consider utilization of a metric or metrics such as, for example, one or more of Defects Per Unit (DPU), Defects per Million Opportunities (DPMO), Parts per Million Defective (PPM), Rolled Throughput Yield (RTY), etc. As an example, data may be searched, filtered, etc., on the basis of one or more quality control metrics.

In the context of data, defects may be as to data itself and/or as to values or other meaning of the data. For example, a value may be an outlier value that is a type of defect and missing data in a stream may be another type of defect. Opportunities can be associated with one or more aspects of data generation, data access, data schema, data transmission, etc.

As an example, a Z Score computation may be used to derive a z statistic from a raw score and known or estimated distribution mean and standard deviation. If variance is known, then a standard deviation can be computed by a square root. As an example, output may include probabilities calculated for different areas under a standard normal curve, which may, for example, correspond to a one-tailed or two-tailed test of significance. As an example, cumulative probabilities may be computed using a standard normal cumulative distribution function (CDF). As an example, a z statistic computation may be used in an inverse manner, for example, to obtain a Z critical value corresponding to a given probability. A Z distribution can be a standard normal distribution of a random variable Z meaning such that it is a normal distribution with a mean of 0 and a variance and a standard deviation equal to 1.

As mentioned, a Z Score may be computed and, for example, referred to as standard score where a Z value is a signed real valued dimensionless quantity which indicates the number of standard deviations by which a given observed data point is distanced from the mean or expected value of a distribution. In such a context, "standard" can refer to the fact that computation is against the standard normal distribution ("Z distribution"), which, as mentioned, can be defined by its mean and standard deviation of zero and one, respectively.

A Z value may be utilized for one or more purposes, for example, in statistical inference and/or estimation. For example, consider use in a Z-test of significance as well as confidence interval calculations. Z values may be used in process control and quality assurance applications (e.g., SIX SIGMA). Due to Z values being standardized scores they can be useful in comparing measurements across different scales.

As explained, input data from a data source may be in one or more forms such as, for example, static files (CSV, JSON, etc.) and/or data streams, for example, where real-time system data may come in bursts. For example, consider a local buffer that can collect data such as sensor data, etc., where the collected data may be transmitted according to time, according to amount of data, according to an encryption technique, according to a compression technique, etc. As an example, local equipment may include one or more processors, controllers, etc., that can process raw data to provide processed data as output. For example, consider raw data that include data acquired over short intervals where the short intervals are averaged to provide an averaged value that is stored to memory and/or transmitted. As an example, as mentioned, measurement of code types of data may be generated locally and then streamed. In such an example, measurements of different pieces of code may be packaged in a message such that the measurements can be compared or otherwise assessed (e.g., as a group, a set, etc.). As an example, certain types of data may be accompanied by a hash or hashes. For example, consider a data packet that includes pieces of data and a hash of the pieces of data. In such an example, the hash may be regenerated at a reception end and compared to the transmitted hash for purposes of data assessment. Such an approach may be in addition to one or more other types of assessed data metrics.

As an example, a system may be implemented in a system such as the system 100 of FIG. 1. For example, consider the GUI 120 and the various data access 125 and visualization 123 features. As an example, a system may be accessible as a computational framework that can be distributed (e.g., cloud-based, etc.) and present in a GUI such as the GUI 120 (see, e.g., "other" 124). As an example, the GUI 120 may provide for access to one or more other GUIs that may provide for customization, linking, listening, customization, control action, etc. As an example, the visualization 123 component of the GUI 120 may utilize a framework such as the OPENGL framework, etc. As an example, the APACHE SPARK framework may be operatively coupled with the OPENGL framework and/or one or more other visualization frameworks.

As an example, a system, a method, etc., may utilize one or more types of data structures that may be associated with one or more computational frameworks. For example, consider one or more of a Resilient Distributed Dataset (RDD), a dataframe (DF) or a dataset (DS).

RDDs can be generated as a collection of objects capable of storing data partitioned across multiple nodes of computing cluster where processing may be in parallel. RDDs can be fault-tolerant, for example, when performing multiple transformations on a RDD if a node fails, the RDD can be capable of recovering automatically.

RDDs can be generated, for example, by parallelizing an existing collection of data, referencing to an external data file as stored, creating a RDD from an already existing a RDD. For example, consider one or more of my_list_rdd=sc.parallelize(my_list), file_rdd=sc.textFile ("path_of_file"), rdd_23.py hosted by X, etc.

As to DFs, they can be a distributed collection of data points where data are organized into named columns. DFs may help in debugging code during a runtime (e.g., a feature that may be unavailable for RDDs). As an example, DFs may read and write data into one or more of various formats (e.g., consider one or more of the following formats CSV, JSON, AVRO, HDFS, HIVE, etc.). As an example, a DF approach may utilize a catalyst optimizer for optimization purposes (e.g., utilizing SQL features, tools, etc.).

As to DSs, they can be an extension of an application programming interface (API). DSs may include features of RDDs and/or DSs. A DS approach can provide a type-safe interface where type safety provides for operation of a compiler in a manner that can validate data types in a DS (e.g., columns, etc.) during compilation to throw an error if a mismatch exists in data types. DSs may be utilized for efficient processing of structured data and/or unstructured data.

As an example, a system, a method, etc., may utilize a framework such as the APACHE SPARK framework, which is a cluster computing framework that supports use of RDDs, DFs and DSs, including a DS API.

In the SPARK framework, a DS can be a distributed collection of data where a DS interface can be provided for utilization and implementation of such data structures (e.g., components, etc.). A DS approach can provide strong typing, ability to use lambda functions, an ability to use a SQL optimized execution engine, etc. A DS may be constructed from JAVA Virtual Machine (JVM) objects and, for example, manipulated using functional transformations (e.g., map, flatMap, filter, etc.). The DS API may be accessed via programming in one or more languages (e.g., consider SCALA, JAVA, etc.). As an example, in the PYTHON language, program code may provide for accessing a field of a row by name naturally row.columnName, etc.

Figure 17:
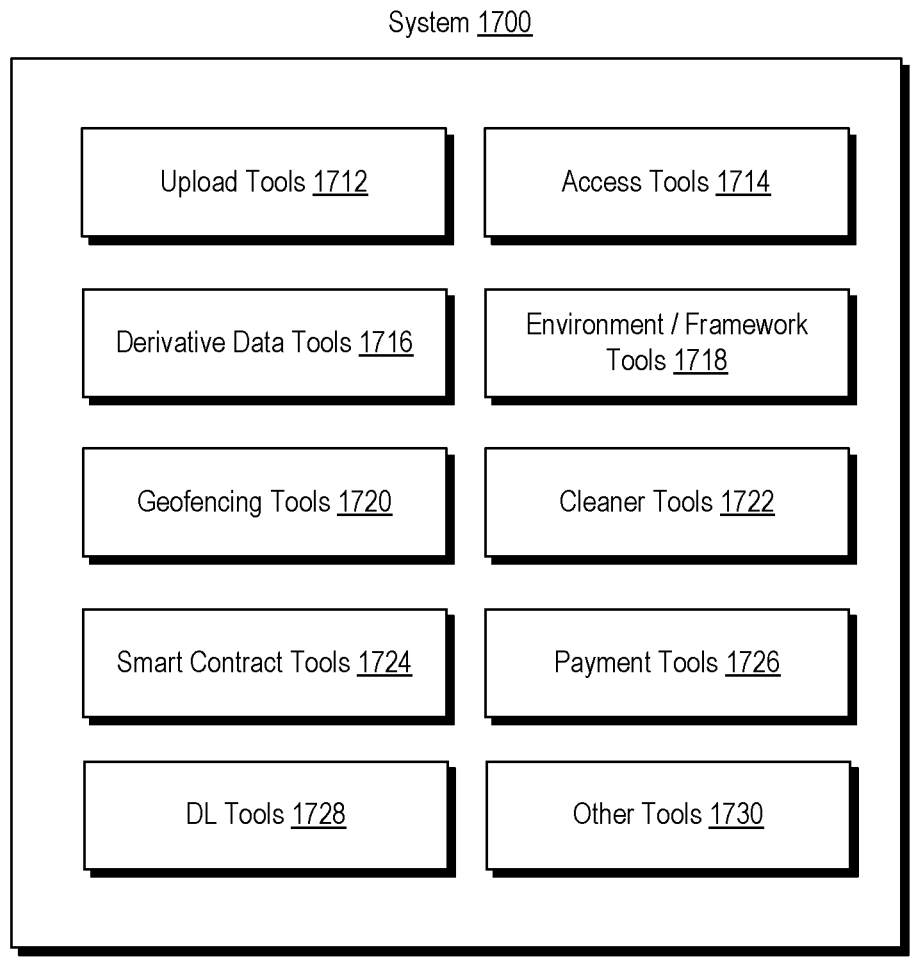
FIG. 17 illustrates an example of a system.

FIG. 17 shows an example of a system 1700 that can include various tools such as upload tools 1712, access tools 1714, derivative data tools 1716, environment and/or framework tools 1718, geofencing tools 1720, cleaner tools 1722, smart contract tools 1724, payment tools 1726, DL tools 1728 and one or more other tools 1730. Such a system may be utilized for one or more workflows involving data. As to the environment and/or framework tools 1718, such tools can provide for links to computational environments and/or frameworks where data may be accessed and processed where processing can include generation of derivative data. As explained, a system may be accessible via an environment such as, for example, the DELFI environment, where a user is licensed to utilize one or more features of the environment. In such an example, the environment can include links to a system for purposes of blockchain registration of data (e.g., derivative data, etc.). As an example, an environment may provide for one or more types of quality control processes that can generate quality controlled data. As an example, where a market exists for data, quality controlled data may be provided for a premium do to quality control assurances. As an example, the one or more other tools 1730 may include one or more quality assurance tools. As an example, quality assurance tools may exist within the system 1700 and/or within one or more environments and/or frameworks. As an example, an owner of data may link a quality control tool to an upload process and/or to an access process such that quality controlled data can be generated upon upload and/or upon an attempt to access.

As shown in FIG. 17, the system 1700 can include one or more cleaner tools 1722, which may be utilized to clean data to generate cleaned data. As an example, cleaned data may be stripped of sensitive information such that a market for data can be enlarged. For example, consider cleaning data of sensitive information such that it can be utilized for purposes of training a machine learning model, testing a machine learning model, etc. As an example, cleaner tools may exist within the system 1700 and/or within one or more environments and/or frameworks. As an example, an owner of data may link a cleaner tool to an upload process and/or to an access process such that quality controlled data can be generated upon upload and/or upon an attempt to access.

As explained, data may be registered on a ledger such that history of use of data can be tracked. As shown, the system 1700 can include payment tools 1726 where payments may be based on type of data, level of quality control, level of cleaning, etc., where history of data may be utilized for one or more billing purposes. As an example, a licensing approach can include tracking usage of derivative data where payments may be for one or more entities (e.g., as derivatives of original data, derivatives of derivative data, etc., are generated).

As an example, an equipment manufacturer, a framework developer, etc., may desire particular data as acquired by equipment, processed by a framework, etc. As an example, the system 1700 can include features for providing such data where, for example, the data are cleaned such that sensitive information is stripped out. In such an example, an equipment manufacturer, framework developer, etc., can access and/or be transmitted data that is registered on a blockchain ledger subject to one or more constraints. Such an approach may provide for improvements to equipment, scheduling maintenance of equipment, upgrades to a framework, etc.

As explained, various aspect of data management can be provided in a smart contract and/or another type of agreement. As explained, an agreement can have an expiration date or expiration dates for data, portions of data, data usages, etc. For example, consider a restriction that expires after a period of time such that a status of data is changed from proprietary to an entity to available to one or more other entities. In such an example, data may become available in a data marketplace managed at least in part by a system such as the system 1700 of FIG. 17.

As explained, a token type of approach can be utilized to follow data and/or track data, which may include local copies of a dataset, derivative data, etc. As an example, a token or tokens may be time sensitive and/or usage limited.

As an example, data may be considered to be analogue data for one or more analogue fields, scenarios, etc. For example, a geologic formation in one region may include similarities to a geologic formation in another region. In such an example, data from one region may be utilized in an analogue workflow in a framework, etc. As an example, one or more processes may be applied to data where such data are to be available for analogue use (e.g., consider cleaning, etc.).

As an example, one or more types of hash-based approaches may be utilized to track or follow derivative data. As explained, multiple blockchains may be generated and managed by a system.

As an example, a system may be operatively coupled to a private network that demands some amount of security measures for access. As explained, a private network approach may provide for some amount of trust, which may decrease demands as to timings, computational resources, etc., when compared, for example, to a proof of work consensus trust system (e.g., akin to Bitcoin, etc.).

As an example, a system can include one or more security mechanisms that may revoke access to data responsive to one or more conditions. For example, consider an attempt by a user to copy data to a particular storage medium. In such an example, data may be utilized within a framework that is linked to the system where interactions between the framework and the system can include notifications as to how data are used, attempted to be stored, etc.

As explained, data in the oil and gas industry can be expensive to acquire, which can lead to a data deficit that can confound efforts to train and/or test machine learning models. Where data can be utilized in a trusted system, with appropriate controls, entities may be able to lend (e.g., license, sell, etc.) certain data for one or more types of uses. As explained, a system and/or one or more frameworks may include features for processing data such that cleaning, quality controlling, etc., can be performed, which may make certain data more appropriate for one or more types of uses. As explained, a system can track data handling, uses, etc., using one or more ledger approaches (e.g., one or more blockchain technologies), where auditing can be available for one or more purposes.

FIG. 18 shows an example of a method 1800 that includes an instantiation block 1810 for instantiating a computational framework responsive to authentication of a credential of an entity; an access block 1820 for, via the computational framework, accessing secure data registered on a blockchain ledger pursuant to a permission constraint of the entity; a process block 1830 for processing the data using the computational framework for generation of derivative data; a transmission block 1840 for, responsive to the generation of the derivative data, automatically transmitting an indicator for registration of the derivative data on the blockchain ledger; and a prevention block 1850 for, upon expiration of the permission constraint of the entity, preventing access to the data and the derivative data by the entity via the computational framework.

The method 1800 is shown in FIG. 18 in association with various computer-readable media (CRM) blocks 1811, 1821, 1831, 1841, and 1851. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1800. As an example, a computer-readable medium (CRM) may be a computer-readable storage medium that is non-transitory and that is not a carrier wave. As an example, one or more of the blocks 1811, 1821, 1831, 1841, and 1851 may be in the form processor-executable instructions.

In the example of FIG. 18, the system 1890 includes one or more information storage devices 1891, one or more computers 1892, one or more networks 1895 and instructions 1896. As to the one or more computers 1892, each computer may include one or more processors (e.g., or processing cores) 1893 and memory 1894 for storing the instructions 1896, for example, executable by at least one of the one or more processors 1893 (see, e.g., the blocks 1811, 1821, 1831, 1841, and 1851). As an example, a computer may include one or more network interfaces (e.g., wired or wireless), one or more graphics cards, a display interface (e.g., wired or wireless), etc.

FIG. 19 shows an example of a method 1900 that includes a reception block 1910 for receiving a request to authenticate a credential of an entity to instantiate a computational framework; a transmission block 1920, after authentication of the credential, transmitting secure data registered on a blockchain ledger pursuant to a permission constraint of the entity; a reception block 1930 for receiving an indicator for registration of derivative data on the blockchain ledger, where the derivative data are generated by processing the data using the computational framework; a registration block 1940 for registering the derivative data on the blockchain ledger; and a prevention block 1950 for, upon expiration of the permission constraint of the entity, preventing access to the data and the derivative data by the entity via the computational framework.

The method 1900 is shown in FIG. 19 in association with various computer-readable media (CRM) blocks 1911, 1921, 1931, 1941, and 1951. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1900. As an example, a computer-readable medium (CRM) may be a computer-readable storage medium that is non-transitory and that is not a carrier wave. As an example, one or more of the blocks 1911, 1921, 1931, 1941, and 1951 may be in the form processor-executable instructions.

In the example of FIG. 19, the system 1990 includes one or more information storage devices 1991, one or more computers 1992, one or more networks 1995 and instructions 1996. As to the one or more computers 1992, each computer may include one or more processors (e.g., or processing cores) 1993 and memory 1994 for storing the instructions 1996, for example, executable by at least one of the one or more processors 1993 (see, e.g., the blocks 1911, 1921, 1931, 1941, and 1951). As an example, a computer may include one or more network interfaces (e.g., wired or wireless), one or more graphics cards, a display interface (e.g., wired or wireless), etc.

As an example, a method can be a front-end method such as, for example, a method that includes instantiating a computational framework responsive to authentication of a credential of an entity; via the computational framework, accessing secure data registered on a blockchain ledger pursuant to a permission constraint of the entity; processing the data using the computational framework for generation of derivative data; responsive to the generation of the derivative data, automatically transmitting an indicator for registration of the derivative data on the blockchain ledger; and, upon expiration of the permission constraint of the entity, preventing access to the data and the derivative data by the entity via the computational framework. In such an example, the permission constraint can include a time constraint. As an example, an indicator can include processing information that identifies one or more processes applied to the data by the computational framework.

As an example, data can include seismic data (e.g., from a seismic survey, etc.) where, for example, derivative data include seismic attribute data.

As an example, data can include well log data where, for example, derivative data include lithology data.

As an example, a method can include accessing a blockchain ledger and generating a family tree visualization that represents at least data and derivative data.

As an example, a method can include searching a blockchain ledger for a process performed on data, derivative data or data and derivative data by an instance of the computational framework. For example, consider a framework specific search and/or filtering using a blockchain ledger.

As an example, a method can include registering data on blockchain ledger where, for example, registering includes communicating with data acquisition equipment that acquires the data and/or where registering occurs in real-time during acquisition of the data by data acquisition equipment.

As an example, a computational framework can include a first authenticated computational framework that generates derivative data as first derivative data where a method includes processing at least a portion of derivative data using a second authenticated computational framework for generation of second derivative data. In such an example, responsive to the generation of the second derivative data, a method can include automatically transmitting an indicator for registration of the second derivative data on the blockchain ledger. For example, consider the blockchain ledger as including indicia of the data, the derivative data in association with the first computational framework, and the second derivative data in association with the second computational framework.

As an example, a method can include utilizing a computational framework that is a cloud-based computational framework where data may be cloud-based data.

As an example, data can be cloud-based data where a computational framework is instantiated using computational resources of a workstation.

As an example, data can include field data acquired using at least one field sensor where a computational framework includes one of a plurality of different computational frameworks of a computational environment (e.g., consider the DELFI environment).

As an example, a system can include a processor; a memory accessible to the processor; processor-executable instructions stored in the memory and executable by the processor to instruct the system to: instantiate a computational framework responsive to authentication of a credential of an entity; via the computational framework, access secure data registered on a blockchain ledger pursuant to a permission constraint of the entity; process the data using the computational framework for generation of derivative data; responsive to the generation of the derivative data, automatically transmit an indicator for registration of the derivative data on the blockchain ledger; and, upon expiration of the permission constraint of the entity, prevent access to the data and the derivative data by the entity via the computational framework.

As an example, one or more computer-readable storage media can include computer-executable instructions executable to instruct a computing system to: instantiate a computational framework responsive to authentication of a credential of an entity; via the computational framework, access secure data registered on a blockchain ledger pursuant to a permission constraint of the entity; process the data using the computational framework for generation of derivative data; responsive to the generation of the derivative data, automatically transmit an indicator for registration of the derivative data on the blockchain ledger; and, upon expiration of the permission constraint of the entity, prevent access to the data and the derivative data by the entity via the computational framework.

As an example, a method may be a back-end method, for example, consider a method that includes receiving a request to authenticate a credential of an entity to instantiate a computational framework; after authentication of the credential, transmitting secure data registered on a blockchain ledger pursuant to a permission constraint of the entity; receiving an indicator for registration of derivative data on the blockchain ledger, where the derivative data are generated by processing the data using the computational framework; registering the derivative data on the blockchain ledger; and, upon expiration of the permission constraint of the entity, preventing access to the data and the derivative data by the entity via the computational framework. In such an example, the permission constraint may be a time constraint.

As an example, a method can include tabulating information from an indicator in association with one or more other indicators. For example, consider generating an invoice based at least in part on the tabulated information.

As an example, a method can include revising a computational framework based at least in part on tabulated information. In such an example, one or more new features may be implemented as may be based on user usage, workflows, requests, etc. Such an approach may help to streamline workflows, provide for increased automation, etc.

As an example, a method can include executing a search engine for searching at least one blockchain ledger responsive to receipt of a search query.

As an example, a method can include generating a data structure that represents relationships between data and at least derivative data.

As an example, a method can include, prior to transmitting data, determining a location as an origin of the request and checking the location against location information registered to a blockchain ledger for the data.

As an example, a method can include responding to a regulatory request by making particular data available and/or transmitting particular data for purposes of regulatory compliance. In such an example, data may be cleaned, quality controlled, and/or otherwise processed to meet regulatory demand(s) with assurances and/or without exposing sensitive information, etc.

As an example, a method can include, prior to transmitting data, determining a type of the computational framework and checking the type against type information registered to the blockchain ledger for the data. For example, a blockchain ledger may provide information that can limit usage, whether directly and/or indirectly (e.g., via one or more smart contracts, etc.).

As an example, a method can include generating a report by processing information for at least data and derivative data.

As an example, a method can include registering derivative data on a blockchain ledger by registering the derivative data for exclusive access by an entity, a framework, etc. As an example, a method can include registering derivative data on a blockchain ledger by registering the derivative data for non-exclusive access by an entity, a framework, etc.

As an example, a blockchain ledger can be a centralized blockchain ledger or a decentralized blockchain ledger.

As an example, a system can include a processor; a memory accessible to the processor; processor-executable instructions stored in the memory and executable by the processor to instruct the system to: receive a request to authenticate a credential of an entity to instantiate a computational framework; after authentication of the credential, transmit secure data registered on a blockchain ledger pursuant to a permission constraint of the entity; receive an indicator for registration of derivative data on the blockchain ledger, where the derivative data are generated by processing the data using the computational framework; register the derivative data on the blockchain ledger; and, upon expiration of the permission constraint of the entity, prevent access to the data and the derivative data by the entity via the computational framework.

As an example, one or more computer-readable storage media can include computer-executable instructions executable to instruct a computing system to: receive a request to authenticate a credential of an entity to instantiate a computational framework; after authentication of the credential, transmit secure data registered on a blockchain ledger pursuant to a permission constraint of the entity; receive an indicator for registration of derivative data on the blockchain ledger, where the derivative data are generated by processing the data using the computational framework; register the derivative data on the blockchain ledger; and, upon expiration of the permission constraint of the entity, prevent access to the data and the derivative data by the entity via the computational framework.

As an example, a computer program product can include one or more computer-readable storage media that can include processor-executable instructions to instruct a computing system to perform one or more methods and/or one or more portions of a method.

Figure 20:
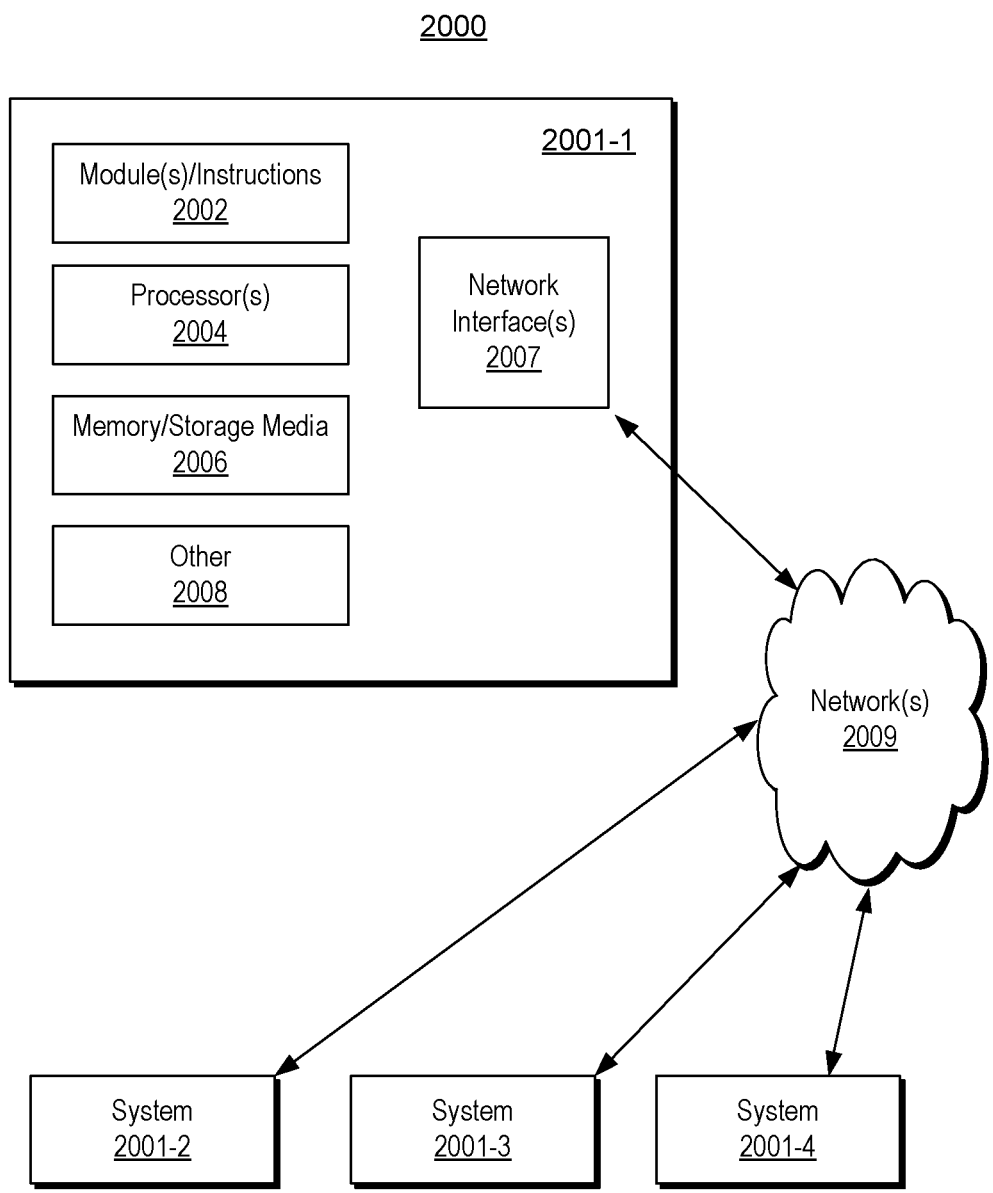
FIG. 20 illustrates examples of computer and network equipment.

In some embodiments, a method or methods may be executed by a computing system. FIG. 20 shows an example of a system 2000 that can include one or more computing systems 2001-1, 2001-2, 2001-3 and 2001-4, which may be operatively coupled via one or more networks 2009, which may include wired and/or wireless networks. As shown, one or more other components 2008 may be included.

As an example, a system can include an individual computer system or an arrangement of distributed computer systems. In the example of FIG. 20, the computer system 2001-1 can include one or more modules 2002, which may be or include processor-executable instructions, for example, executable to perform various tasks (e.g., receiving information, requesting information, processing information, simulation, outputting information, etc.).

As an example, a module may be executed independently, or in coordination with, one or more processors 2004, which is (or are) operatively coupled to one or more storage media 2006 (e.g., via wire, wirelessly, etc.). As an example, one or more of the one or more processors 2004 can be operatively coupled to at least one of one or more network interface 2007. In such an example, the computer system 2001-1 can transmit and/or receive information, for example, via the one or more networks 2009 (e.g., consider one or more of the Internet, a private network, a cellular network, a satellite network, etc.).

As an example, the computer system 2001-1 may receive from and/or transmit information to one or more other devices, which may be or include, for example, one or more of the computer systems 2001-2, etc. A device may be located in a physical location that differs from that of the computer system 2001-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2006 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 21:
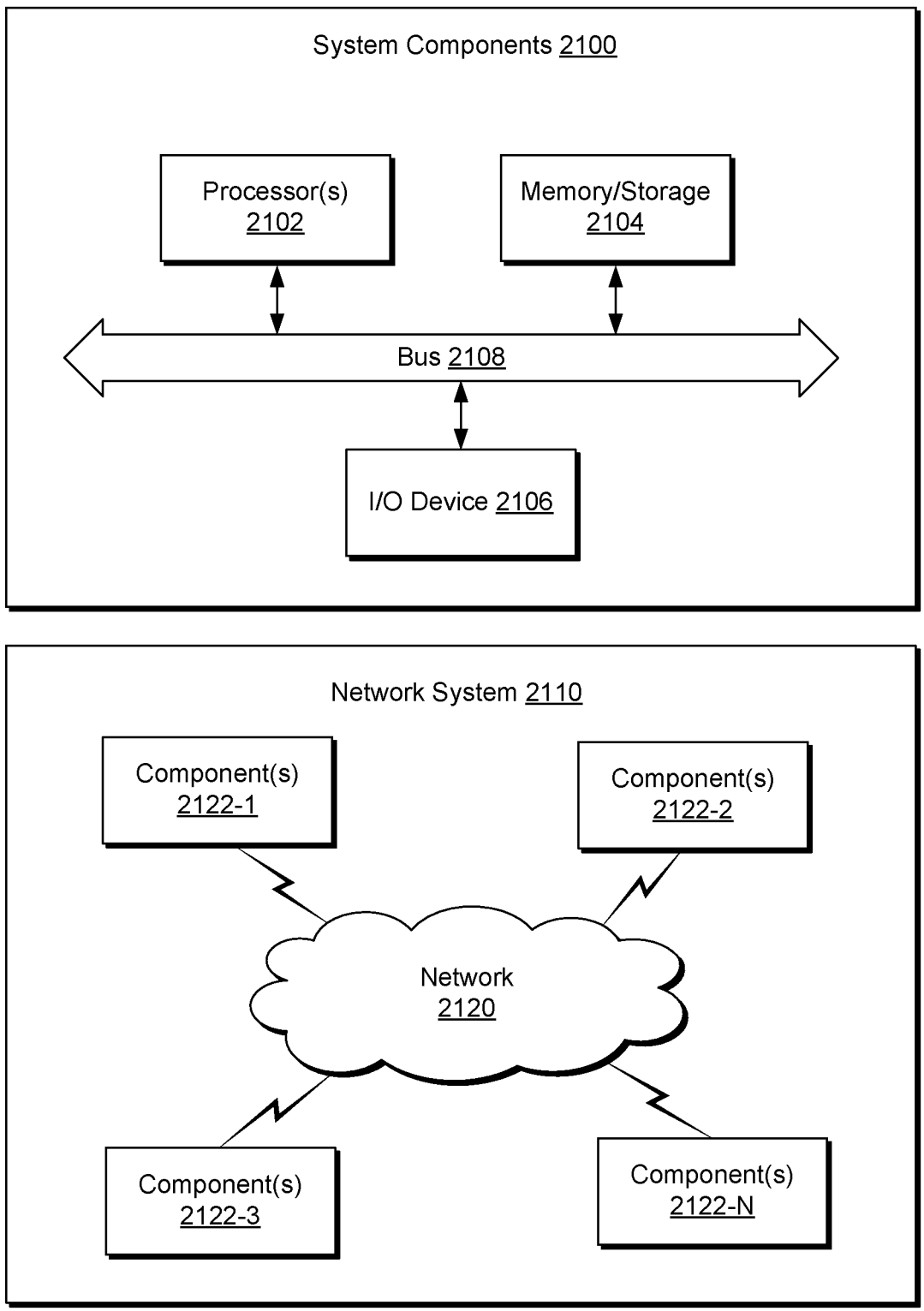
FIG. 21 illustrates example components of a system and a networked system.

FIG. 21 shows components of an example of a computing system 2100 and an example of a networked system 2110 with a network 2120. The system 2100 includes one or more processors 2102, memory and/or storage components 2104, one or more input and/or output devices 2106 and a bus 2108. In an example embodiment, instructions may be stored in one or more computer-readable media (e.g., memory/storage components 2104). Such instructions may be read by one or more processors (e.g., the processor(s) 2102) via a communication bus (e.g., the bus 2108), which may be wired or wireless. The one or more processors may execute such instructions to implement (wholly or in part) one or more attributes (e.g., as part of a method). A user may view output from and interact with a process via an I/O device (e.g., the device 2106). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2110. The network system 2110 includes components 2122-1, 2122-2, 2122-3, . . . 2122-N. For example, the components 2122-1 may include the processor(s) 2102 while the component(s) 2122-3 may include a memory accessible by the processor(s) 2102. Further, the component(s) 2122-2 may include an I/O device for display and optionally interaction with a method. The network 2120 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
    instantiating a computational framework responsive to authentication of a credential of an entity, the computational framework comprising an execution environment configured to process secure data registered on a blockchain ledger and to enforce permission constraints registered on the blockchain ledger for the secure data;
    via the computational framework, accessing secure wellbore data registered on the blockchain ledger pursuant to a permission constraint of the entity, wherein the secure wellbore data is data associated with an operation of a wellbore;
    processing the secure wellbore data using the execution environment of the computational framework to generate secure derivative wellbore data;
    responsive to the generation of the secure derivative wellbore data within the execution environment, automatically registering the secure derivative wellbore data on the blockchain ledger, wherein registering the secure derivative wellbore data includes indicating that the permission constraint of the entity applies to the secure derivative wellbore data; and
    upon expiration of the permission constraint of the entity, preventing access to the secure wellbore data and to the secure derivative wellbore data by the entity via the computational framework.

2. The method of claim 1, wherein processing the secure wellbore data to generate the secure derivative wellbore data by the execution environment of the computational framework includes one or more of:
    training a machine learning model with the secure derivative wellbore data;
    generating a simulation with the secure derivative wellbore data; or
    generating an interpretation of the secure derivative wellbore data.

3. The method of claim 1, wherein registering the secure derivative wellbore data on the blockchain ledger includes identifying how the secure wellbore data was used by the computational framework.

4. The method of claim 1, wherein the secure wellbore data comprise seismic data, and wherein the secure derivative wellbore data comprise seismic attribute data.

5. The method of claim 1, wherein the secure wellbore data comprise well log data, and wherein the secure derivative wellbore data comprise lithology data generated from processing the secure wellbore data with the execution environment.

6. The method of claim 1, further comprising accessing the blockchain ledger and generating a family tree visualization that represents at least the secure wellbore data and the secure derivative wellbore data.

7. The method of claim 1, further comprising searching the blockchain ledger for processing the secure wellbore data to generate the secure derivative wellbore data by an instance of the computational framework.

8. The method of claim 1, further comprising registering the secure wellbore data on the blockchain ledger including communicating with data acquisition equipment that acquires the secure wellbore data.

9. The method of claim 1, further comprising registering the secure wellbore data on the blockchain ledger in real-time during acquisition of the secure wellbore data by data acquisition equipment.

10. The method of claim 1, wherein the computational framework comprises a first authenticated computational framework and further comprising generating at least a portion of the secure derivative wellbore data using a second authenticated computational framework for generation of second secure derivative wellbore data.

11. The method of claim 10, further comprising, responsive to the generation of the second secure derivative wellbore data, automatically registering the second secure derivative wellbore data on the blockchain ledger, wherein the secure derivative wellbore data is associated with the first authenticated computational framework, and the second secure derivative wellbore data is associated with the second authenticated computational framework.

12. The method of claim 1, wherein the computational framework is a cloud-based computational framework and wherein the secure wellbore data are cloud-based data.

13. The method of claim 1, wherein the secure wellbore data comprise field data acquired using at least one field sensor and wherein the execution environment of the computational framework includes a plurality of different computational tools for processing the secure wellbore data to generate the secure derivative wellbore data.

14. A method comprising:
- receiving a request to authenticate a credential of an entity to instantiate a computational framework, the computational framework comprising an execution environment configured to process secure data registered on a blockchain ledger, and to enforce permission constraints registered on the blockchain ledger;
- generating a smart contract on the blockchain ledger representative of a permission constraint of the entity, wherein the smart contract automatically controls use by the entity of the secure data registered on the blockchain ledger;
- after authentication of the credential, instantiating an instance of the computational framework; and
- automatically executing the smart contract to enforce the permission constraint of the entity, wherein automatically executing the smart contract includes:
  - registering derivative data on the blockchain ledger that is generated by processing the secure data using the execution environment of the computational framework; and
  - upon expiration of the permission constraint of the entity, preventing access to the secure data and the derivative data by the entity via the computational framework.

15. The method of claim 14, wherein the permission constraint comprises a time constraint.

16. The method of claim 14, wherein the permission constraint comprises a geofencing constraint.

17. The method of claim 14, wherein the smart contract is implemented on the blockchain ledger via chaincode.

18. The method of claim 14, wherein registering the derivative data on the blockchain ledger comprises registering the derivative data for exclusive access by the entity or for non-exclusive access by the entity.

19. The method of claim 14, wherein the blockchain ledger is a centralized blockchain ledger or a decentralized blockchain ledger.

20. A system comprising:
- a processor;
- a memory accessible to the processor; and
- processor-executable instructions stored in the memory and executable by the processor to instruct the system to:
  - instantiate a computational framework responsive to authentication of a credential of an entity, the computational framework comprising an execution environment configured to process secure data registered on a blockchain ledger, and to enforce permission constraints registered on the blockchain ledger for the secure data;
  - via the computational framework, access secure wellbore data registered on the blockchain ledger pursuant to a permission constraint of the entity, wherein the secure wellbore data is data associated with an operation of a wellbore;
  - process the secure wellbore data using the execution environment of the computational framework to generate secure derivative wellbore data;
  - responsive to the generation of the secure derivative wellbore data within the execution environment, automatically register the secure derivative wellbore data on the blockchain ledger, wherein registering the secure derivative wellbore data includes indicating that the permission constraint of the entity applies to the secure derivative wellbore data; and
  - upon expiration of the permission constraint of the entity, prevent access to the secure wellbore data and to the secure derivative wellbore data by the entity via the computational framework.

* * * * *